United States Patent
Sawata

(10) Patent No.: US 11,966,652 B2
(45) Date of Patent: Apr. 23, 2024

(54) INFORMATION PROCESSING DEVICE AND NON-TRANSITORY COMPUTER READABLE MEDIUM

(71) Applicant: FUJIFILM BUSINESS INNOVATION CORP., Tokyo (JP)

(72) Inventor: Naohiro Sawata, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 445 days.

(21) Appl. No.: 17/147,788

(22) Filed: Jan. 13, 2021

(65) Prior Publication Data

US 2022/0035588 A1 Feb. 3, 2022

(30) Foreign Application Priority Data

Jul. 29, 2020 (JP) ................................. 2020-128486

(51) Int. Cl.
G06F 3/12 (2006.01)
(52) U.S. Cl.
CPC .......... *G06F 3/1275* (2013.01); *G06F 3/1204* (2013.01); *G06F 3/1243* (2013.01); *G06F 3/1296* (2013.01)
(58) Field of Classification Search
None
See application file for complete search history.

(56) References Cited

U.S. PATENT DOCUMENTS

2010/0328716 A1* 12/2010 Mori ..................... G06F 3/1256
358/1.15
2017/0003923 A1 1/2017 Hane
2020/0034587 A1* 1/2020 Isobe ................... G06F 3/1234

FOREIGN PATENT DOCUMENTS

JP 2017-016315 A 1/2017

* cited by examiner

*Primary Examiner* — Frantz Bataille
(74) *Attorney, Agent, or Firm* — Oliff PLC

(57) ABSTRACT

An information processing device includes: a processor configured to: specify plural parts for manufacturing ordered product; specify plural processes required from receiving order of product to completion of product using plural parts; for intermediate part generated by processing at least two plural parts, generate intermediate object indicating intermediate part; for each plural parts, generate work objects indicating processes required for manufacturing part; create workflow information that arranges and displays, for each plural parts, work objects indicating processes required for manufacturing part in order of plural processes, and relates and displays, for each plural parts, work objects indicating processes executed continuously, in workflow information, intermediate object indicating intermediate part is associated with work objects for at least two parts used to generate intermediate part; and when processing for intermediate part cannot be started in created workflow information, perform control of displaying progress status of at least two parts constituting intermediate part.

20 Claims, 23 Drawing Sheets

DETAILS

| PART NAME | PART TYPE NAME | STATUS | PROCESS |
|---|---|---|---|
| | | PROCESS | NOT STARTED |

| PART TYPE NAME | PRINTING PROCESS NAME | PRINTING PROCESS NAME |
|---|---|---|
| | | DUMMY PROCESSING — 271 |

STATUS: NOT STARTED — 272

| ITEM | DETAILS | | ▼ CHANGE |
|---|---|---|---|
| SCHEDULED PRINTING MACHINE ID | 1 | | |
| LOGICAL PRINTER NAME | dummy_per_press | LOGICAL PRINTER NAME | ✎ |
| PRINTING PROCESS ID | 1 | | |
| PRINTING PROCESS NAME | | PRINTING PROCESS NAME | ✎ |
| THE NUMBER OF IMPOSITIONS | 1 | | ✎ |
| THE NUMBER OF ALLOCATIONS | 1 | | ✎ |
| THE NUMBER OF SHEETS | 1 | | ✎ |
| PAPER AMOUNT (m) | 1.0 | | ✎ |
| DESIGNATED PRINT SPEED | | IMAGE QUALITY PRIORITY: 50m/min | ✎ |
| DESIGNATED DISCHARGE SURFACE | Face Down | | ✎ |

[CANCEL EDITING] [APPLY]

[CLOSE]

FIG. 20A

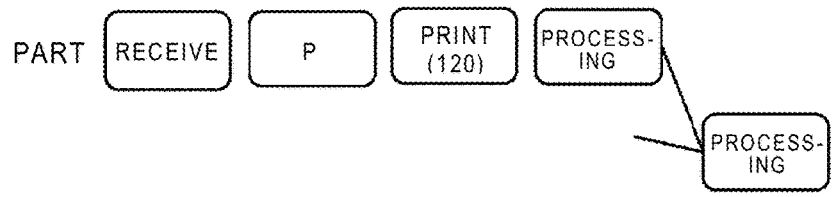

THE NUMBER OF ORDERED
COPIES
100
THE NUMBER OF INTERNAL
RESERVES
20
THE NUMBER OF COPIES
TO BE MANUFACTURED
120
THE NUMBER OF COPIES
TO BE PRINTED
120

FIG. 20B

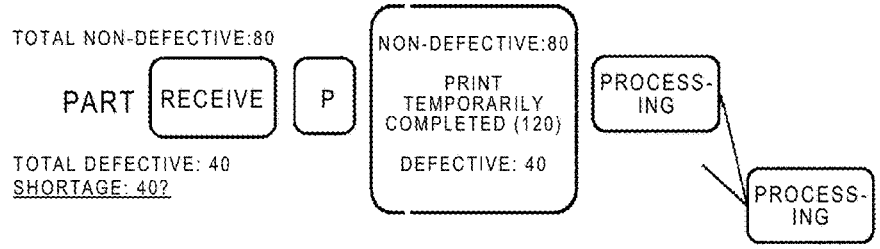

THE NUMBER OF ORDERED
COPIES
100
THE NUMBER OF INTERNAL
RESERVES
20
THE NUMBER OF COPIES
TO BE MANUFACTURED
120
THE NUMBER OF COPIES
TO BE PRINTED
120

FIG. 20C

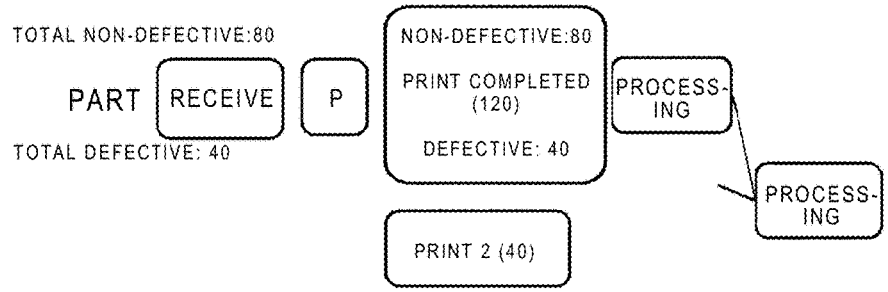

THE NUMBER OF ORDERED
COPIES
100
THE NUMBER OF INTERNAL
RESERVES
20
THE NUMBER OF COPIES
TO BE MANUFACTURED
120
THE NUMBER OF COPIES
TO BE PRINTED
120

FIG. 21A

THE NUMBER OF ORDERED COPIES
100
THE NUMBER OF INTERNAL RESERVES
20
THE NUMBER OF COPIES TO BE MANUFACTURED
120
THE NUMBER OF COPIES TO BE PRINTED
40

TOTAL NON-DEFECTIVE: 110

TOTAL DEFECTIVE: 50

PART → RECEIVE → P →
- NON-DEFECTIVE: 80 / PRINT COMPLETED (120) / DEFECTIVE: 40 → PROCESSING
- NON-DEFECTIVE: 30 / PRINT TEMPORARILY COMPLETED 2 (40) / DEFECTIVE: 10 → PROCESSING

FIG. 21B

THE NUMBER OF ORDERED COPIES
100
THE NUMBER OF INTERNAL RESERVES
20
THE NUMBER OF COPIES TO BE MANUFACTURED
120
THE NUMBER OF COPIES TO BE PRINTED
40

TOTAL NON-DEFECTIVE: 110

TOTAL DEFECTIVE: 50

PART → RECEIVE → P →
- NON-DEFECTIVE: 80 / PRINT COMPLETED (120) / DEFECTIVE: 40 → PROCESSING
- NON-DEFECTIVE: 30 / PRINT COMPLETED 2 (40) / DEFECTIVE: 10 → PROCESSING

FIG. 21C

THE NUMBER OF ORDERED COPIES
100
THE NUMBER OF INTERNAL RESERVES
20
THE NUMBER OF COPIES TO BE MANUFACTURED
120
THE NUMBER OF COPIES TO BE PRINTED
40

TOTAL NON-DEFECTIVE: 0

TOTAL DEFECTIVE: 0

PART → RECEIVE → P →
- NON-DEFECTIVE: 80 / PRINT COMPLETED (120) / DEFECTIVE: 40 → PROCESSING 120
- NON-DEFECTIV: 30 / PRINT COMPLETED (40) / DEFECTIVE: 10 → PROCESSING

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-128486 filed Jul. 29, 2020.

BACKGROUND

(i) Technical Field

The present disclosure relates to an information processing device and a non-transitory computer readable medium.

(ii) Related Art

For example, JP-A-2017-16315 discloses a workflow creation support device that supports creation of a workflow for performing a printing operation. The workflow creation support device includes a job information acquiring unit that acquires job information including information on plural parameters for specifying contents of a job. The workflow creation support device includes a narrowing-down processing unit that uses information on at least a part of parameters of information on plural parameters acquired by the job information acquiring unit to narrow down templates that are selection candidates from plural templates registered in advance. The workflow creation support device includes a selection screen data creation unit that creates selection screen data used to display a selection screen on which information on the template narrowed down by the narrowing-down processing unit is displayed and a selection operation of allowing a user to select one template from the selection candidates is received. The workflow creation support device includes a job definition file creation unit that creates a job definition file based on the information on the selected one template by the selection operation and the information on the plural parameters.

SUMMARY

When process control is performed using a workflow for manufacturing a print product corresponding to a request, control corresponding to various specifications such as a print form and a manufacturing process of the print product is required. Thus, the workflow is individually created for each print product, and the process control is performed. However, the print products are a wide variety of print products including various specifications such as the printing form and the manufacturing process.

Furthermore, even if an intermediate part is generated as a product-in-process in the manufacturing process of the print product, progress control for the intermediate part is not considered in a workflow of the related art. Therefore, when processing for the intermediate part of the print product cannot be started, a cause cannot be known and appropriate countermeasure cannot be taken.

Aspects of non-limiting embodiments of the present disclosure relate to an information processing device and a non-transitory computer readable medium capable of more easily knowing a cause of processing for an intermediate part being unable to start as compared with a case in which a workflow is generated and managed without treating an intermediate part generated by combining plural parts as a control target.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including: a processor configured to: specify plural parts for manufacturing an ordered product; specify plural processes required from receiving an order of the product to completion of the product using the plural parts; for an intermediate part generated by processing at least two of the plural parts, generate an intermediate object indicating the intermediate part; for each of the plural parts, generate work objects indicating processes required for manufacturing the part; create workflow information that arranges and displays, for each of the plural parts, the work objects indicating the processes required for manufacturing the part in an order of the plural processes, and relates and displays, for each of the plural parts, work objects indicating processes executed continuously, in which in the workflow information, the intermediate object indicating the intermediate part is associated with the work objects for the at least two parts used to generate the intermediate part; and when processing for the intermediate part cannot be started in the created workflow information, perform control of displaying a progress status of each of the at least two parts constituting the intermediate part.

BRIEF DESCRIPTION OF THE DRAWINGS

Exemplary embodiment(s) of the present disclosure will be described in detail based on the following figures, wherein:

FIG. 17 illustrates an example of a detail screen according to the exemplary embodiment;

FIGS. 20A to 20C illustrate an example of a method of adding a process of reprocessing according to the exemplary embodiment;

FIGS. 21A to 21C illustrate another example of a method of adding a process of reprocessing according to the exemplary embodiment;

DETAILED DESCRIPTION

Hereinafter, exemplary embodiments of the present disclosure will be described in detail with reference to the accompanying drawings. Elements and processing having the same operations, actions, and functions may be given the same reference signs throughout the drawings, and redundant description may be appropriately omitted. The drawings are merely schematic representations to facilitate understanding of the technique of the present disclosure. Therefore, the technique of the present disclosure is not limited only to illustrated examples. In the present exemplary embodiment, descriptions of a configuration that is not directly related to the present disclosure and a known configuration may be omitted.

In the present disclosure, a "product" conceptually includes a printed matter, a print product, a complex of plural similar or different printed matters, and an article (including the printed matter) at a dispatching stage. A "part" conceptually includes a part of elements constituting the "product". An "intermediate part" conceptually includes an article such as a product-in-process generated by processing at least two "parts" before the "product" is manufactured, that is, from when the product is ordered to when the product is completed. "Processing" conceptually includes not only processing of giving a deformation or a change to an article, but also processing of generating a combined article obtained by combining plural articles, and article processing of performing work on an article.

A "process" conceptually includes work to be executed from when the product is ordered to when the product is completed. The "process" includes minimum work to be executed from when the product is ordered to when the product is completed, as a unit. A "manufacturing process" conceptually includes a process of manufacturing parts in the product. A "work object" conceptually includes information indicating work at a time of a part manufacture such as plate making and printing. An "intermediate object" conceptually includes (i) work for parts and (ii) information on an intermediate part that is a deliverable of the work.

A printing operation of a print product including a printed matter includes, as main processes, order, production of an original, prepress (test printing), printing (final printing), processing, and dispatching.

Figure 1:
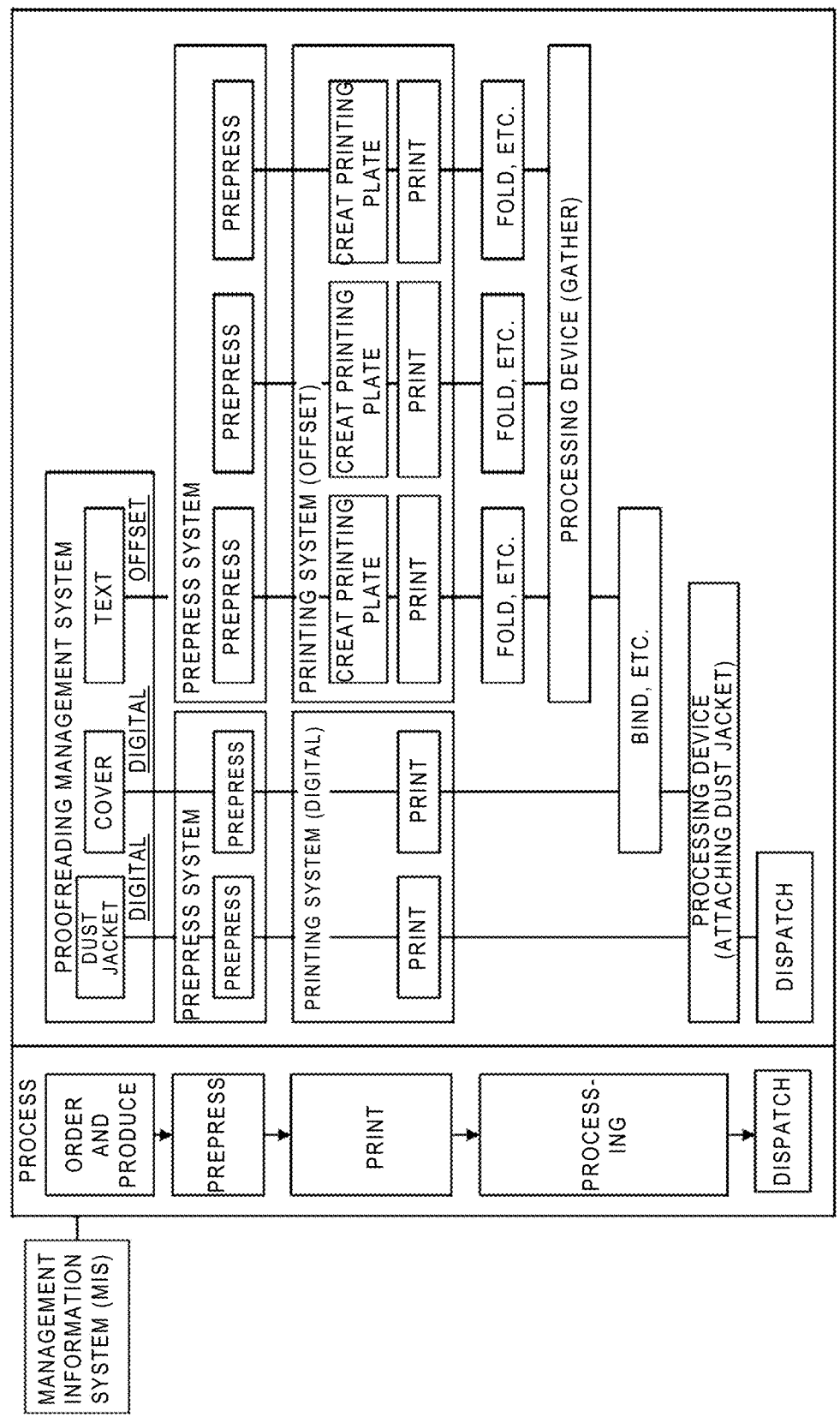
FIG. 1 is a schematic diagram of a process related to manufacture of a print product according to an exemplary embodiment.

FIG. 1 illustrates a schematic example of a process related to manufacture of a print product according to the exemplary embodiment.

FIG. 1 illustrates a case in which the print product is, for example, formed of parts of a dust jacket, a cover, and a text, the parts of the jacket and the cover are formed by digital printing, and the part of the text is formed by offset printing.

An order and production process is a process of receiving an order for manufacture of a print product from a requester and producing electronic data of an original for printing. Processing in the order and production process is performed by, for example, a proofreading management system.

A "prepress process" is used as a general term for processes before the print product is printed. For a generally submitted original, the prepress process may include processes such as design, phototypesetting, formation, artwork creation, color separation, retouching, stripping, and printing plate making. Test printing may be performed if necessary, and the prepress process may be used to confirm quality of a printing result. Based on the result of the test printing, it is determined whether it is necessary to correct (proofread) original data. When the printing result does not meet a request of the requester, the proofreading is performed. Processing in the prepress process is performed by, for example, a prepress system.

When the result of the test printing by the prepress meets the request of the requester, a process proceeds to a printing process.

The printing process is a process of printing on paper or another printing medium based on design data for the printing. The printing process may include a process of creating a printing plate based on the design data for the printing. When the offset printing is performed, the printing is performed on the paper or the other printing medium using the printing plate created based on the design data for the printing. When the digital printing known as computer to plate (CTP) printing is performed by a digital printing device, it is not necessary to prepare the printing plate. The "printing device" conceptually includes a printing machine, a printer, an image forming device, an image recording device, and the like. Processing in the printing process is performed by, for example, a printing system.

A processing process is a process of performing various processing on printed parts and printed products. Here, the term "processing" is, for example, a general term for various processing performed on the printed matter that has been printed. Specific examples of the processing include cutting processing, folding processing, gathering processing, binding processing, special processing, surface processing, bookbinding processing, and the like. The processing is not limited to one type, and plural processing may be combined. Through the processing process, the print product is arranged into a book, a magazine, a pamphlet, a catalog, or other product forms. Processing in the processing process is performed by, for example, a processing device.

A dispatching process is a process of dispatching a manufactured print product including plural parts to the requester.

A workflow is used to efficiently operate and manage such a series of printing operations.

In the present exemplary embodiment, when the manufacture of the product is managed using the workflow from the manufacturing request to the completion of the print product, the workflow is individually created for each of a wide variety of print products, and process control is performed. However, during manufacturing of a print product including plural parts, an intermediate part may be generated. In this case, when the manufacturing process is managed from the manufacturing request to the completion of the print product, it is difficult to easily know which parts constitute each intermediate part.

Further, progress control for the formed intermediate part is not considered in a workflow of the related art. Therefore, when processing for the intermediate part of the print product cannot be started, a cause cannot be known and appropriate countermeasure cannot be taken.

Therefore, in the present exemplary embodiment, plural parts for manufacturing an ordered print product are specified, and plural processes required from receiving the order of the print product to completion of the print product are specified. For an intermediate part generated by processing at least two of the plural parts, an intermediate object indicating the intermediate part is generated. For each of the plural parts, work objects indicating processes required for manufacturing the part are generated. Then, workflow information is created. The workflow information displays, for each of the plural parts, the work objects indicating the processes required for manufacturing the part in an order of the plural processes, and relates and displays the work objects indicating the processes executed continuously. In the workflow information, each intermediate object indicating the intermediate part is associated with the work objects for the at least two parts used to generate the intermediate part. Then, in the present exemplary embodiment, when the processing for the intermediate part cannot be started in the created workflow information, control is performed to display a progress status of each of the at least two parts constituting the intermediate part.

Figure 2:
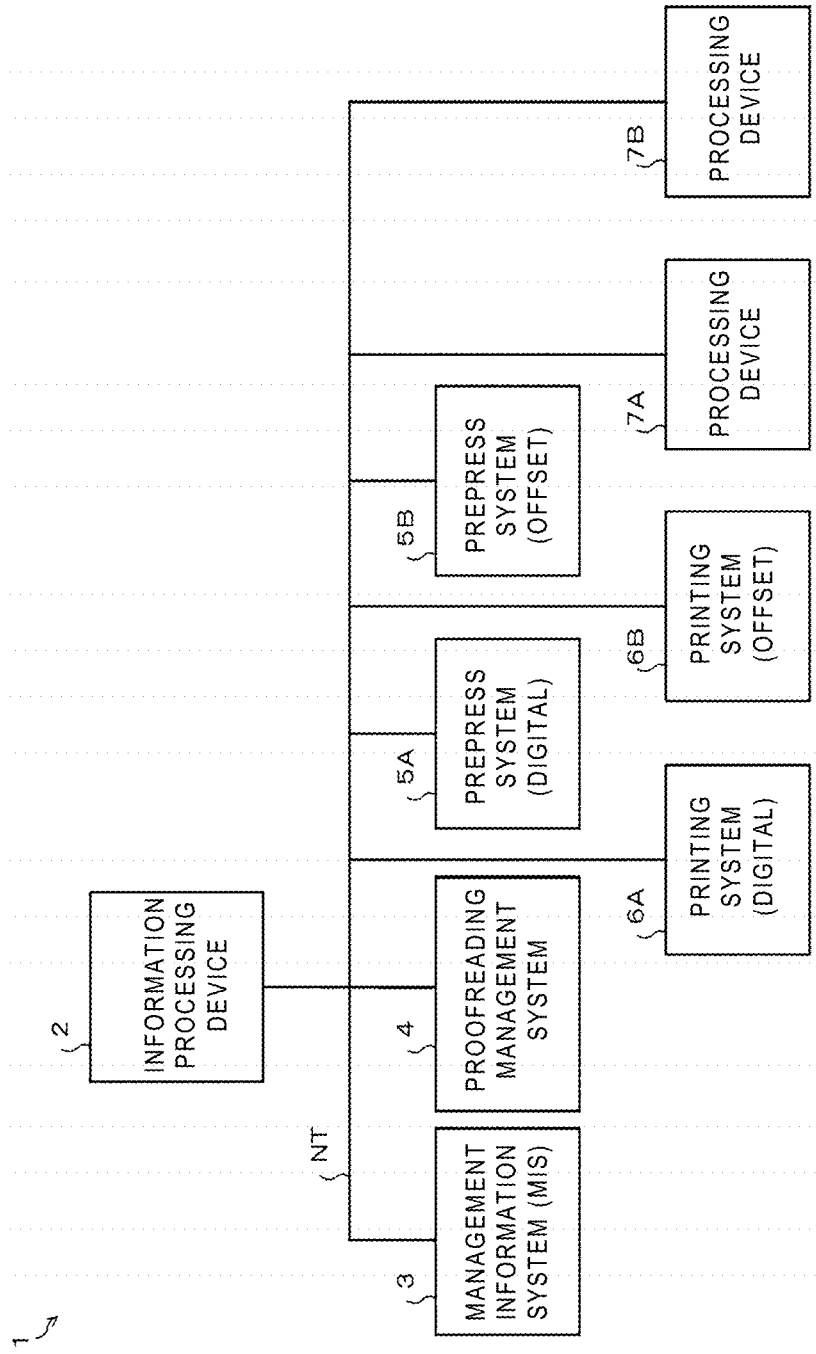
FIG. 2 illustrates a schematic configuration of a print network system according to the exemplary embodiment.

FIG. 2 illustrates a schematic configuration of a printing network system 1 according to an exemplary embodiment for performing a technique of the present disclosure.

As illustrated in FIG. 2, the printing network system 1 includes an information processing device 2, a management information system 3, a proofreading management system 4, a prepress system 5A, a prepress system 5B, a printing system 6A, a printing system 6B, a processing device 7A, and a processing device 7B. The information processing device 2, the management information system 3, the proofreading management system 4, the prepress system 5A, the prepress system 5B, the printing system 6A, the printing system 6B, the processing device 7A, and the processing device 7B are connected to a network NT, and exchange information with each other. For example, the Internet, a local area network (LAN), and a wide area network (WAN) are applied to the network NT.

The information processing device 2 is a computer system having a workflow creation support function that supports creation of a workflow for performing printing operation. For example, a general-purpose computer device such as a server computer or a personal computer (PC) is applied to the information processing device 2.

The management information system (hereinafter referred to as "MIS") 3 is a computer system that manages printing-related management information, and performs production process control and inventory control for the print products. The management information may include, for example, various information such as order information, estimation information, sales information, a management plan, and inventory information. The present exemplary embodiment describes, for example, a case in which the MIS 3 transmits information necessary for manufacturing the print product in an extensible markup language (XML) format. The MIS 3 may use information such as a job definition format (JDF) and a job messaging format (JMF).

The proofreading management system 4 is a computer system that receives an order for manufacture of a print product from the requester and produces and proofreads electronic data of an original for printing. The proofreading management system 4 outputs data indicating the original of the print product.

The prepress systems 5A and 5B are computer systems that perform the test printing before the print product is printed and confirm the quality of the printing result. For example, a system including a digital printing device that performs the printing without using the printing plate is applied to the prepress system 5A. For example, a system including an offset printing device that performs the printing with using the printing plate is applied to the prepress system 5B.

The printing systems 6A and 6B are computer systems that process the printing on paper or other printing medium based on the design data for the printing. For example, the system including the digital printing device that performs the printing without using the printing plate is applied to the printing system 6A. For example, the system including the offset printing device that performs the printing with using the printing plate is applied to the printing system 6B.

The processing devices 7A and 7B are devices that perform various processing on the parts and the product. For example, a dust jacket attaching device that attaches a dust jacket to a product for which forming of parts constituting the product are completed is applied to the processing device 7A. For example, a gathering device that gathers parts that are subjected to the offset printing and the folding processing is applied to the processing device 7B.

The printing operation of the print product is not limited to the above-described systems and devices, and may include other systems and other devices that may be used in the printing operation. For example, the printing operation may include a print-ready plate management system that allows the requester of the print product to confirm print contents known as a print-ready plate, and confirm, approve and request to proceed to a printing execution stage.

Figure 3:
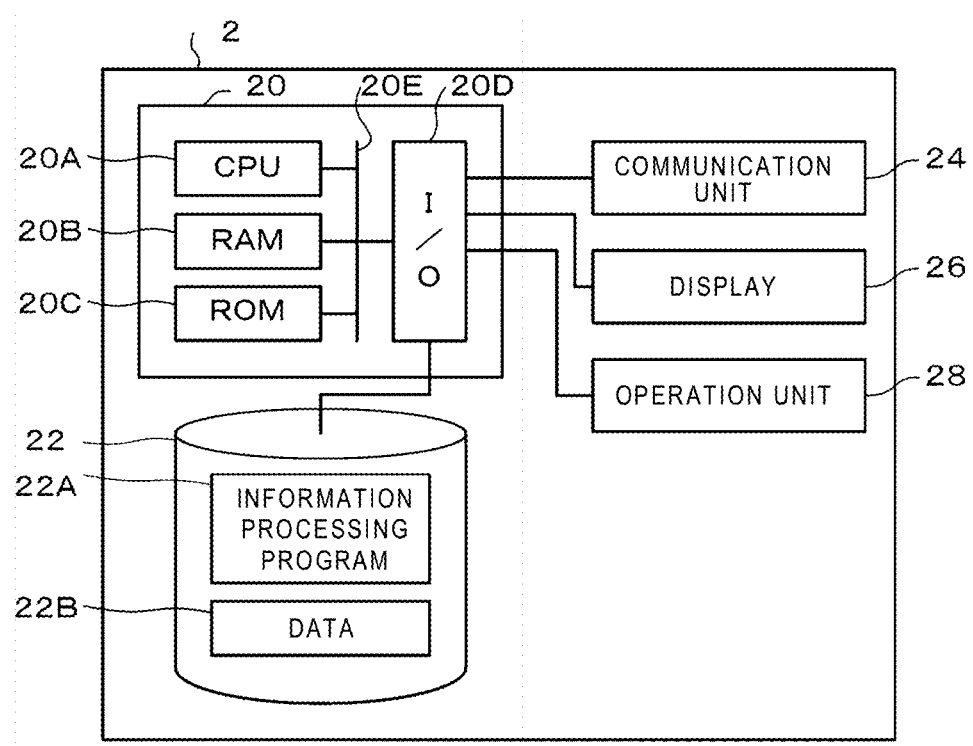
FIG. 3 is a block diagram illustrating an example of an electrical configuration of an information processing device according to the exemplary embodiment.

FIG. 3 is a block diagram illustrating an example of an electrical configuration of the information processing device 2 according to the present exemplary embodiment.

As illustrated in FIG. 3, the information processing device 2 according to the present exemplary embodiment includes a controller 20, a storage 22, a communication unit 24, a display 26, and an operation unit 28.

The controller 20 includes a central processing unit (CPU) 20A, a random access memory (RAM) 20B, a read only memory (ROM) 20C, and an input and output interface (I/O) 20D, which are connected with each other via a bus 20E. Here, the CPU 20A is an example of a processor.

Each of functional units including the storage 22, the communication unit 24, the display 26, and the operation unit 28 is connected to the I/O 20D. These functional units can communicate with the CPU 20A via the I/O 20D.

The controller 20 may be configured as a sub controller that controls a part of operations of the information processing device 2, or may be configured as a part of a main controller that controls an entire operation of the information processing device 2. For example, an integrated circuit (IC) such as a large scale integration (LSI) or an IC chipset is used for a part or all of each block of the controller 20. An individual circuit may be used for each block, or a circuit in which a part or all of the blocks are integrated may be used. The blocks may be provided integrally, or a part of the blocks may be provided separately. In each block, a part of the block may be provided separately. The controller 20 may be integrated not only in the LSI but also in a dedicated circuit or a general-purpose processor.

An auxiliary storage device such as a hard disk drive (HDD), a solid state drive (SSD), and a flash memory may be used as the storage 22. An information processing program 22A for implementing information processing according to the present exemplary embodiment and data 22B are stored in the storage 22. The CPU 20A reads the information processing program 22A from the storage 22, loads the information processing program 22A into the RAM 20B, and executes processing. Accordingly, the information processing device 2 that executes the information processing program 22A operates as an information processing device of the present disclosure. The information processing program 22A may be stored in the ROM 20C.

The information processing program 22A may be installed, for example, in advance in the information processing device 2. The information processing program 22A may be stored in a non-volatile storage medium or may be distributed via the network NT, and appropriately installed in the information processing device 2. Examples of the non-volatile storage medium include a compact disc read only memory (CD-ROM), a magnetooptical disc, an HDD, a digital versatile disc read only memory (DVD-ROM), a flash memory, a memory card, and the like.

The display 26 uses, for example, a liquid crystal display (LCD) or an organic electro luminescence (EL) display. The display 26 may include a touch panel integrally. The operation unit 28 is provided with a device for operation input such as a keyboard and a mouse. The display 26 and the operation unit 28 receive various instructions from a user of the information processing device 2. The display 26 displays various information such as a result of processing executed according to the instruction received from the user and a notification of the processing.

The communication unit 24 is connected to the network NT such as the Internet, the LAN, and the WAN, and can communicate with an external device via the network NT.

Figure 4:
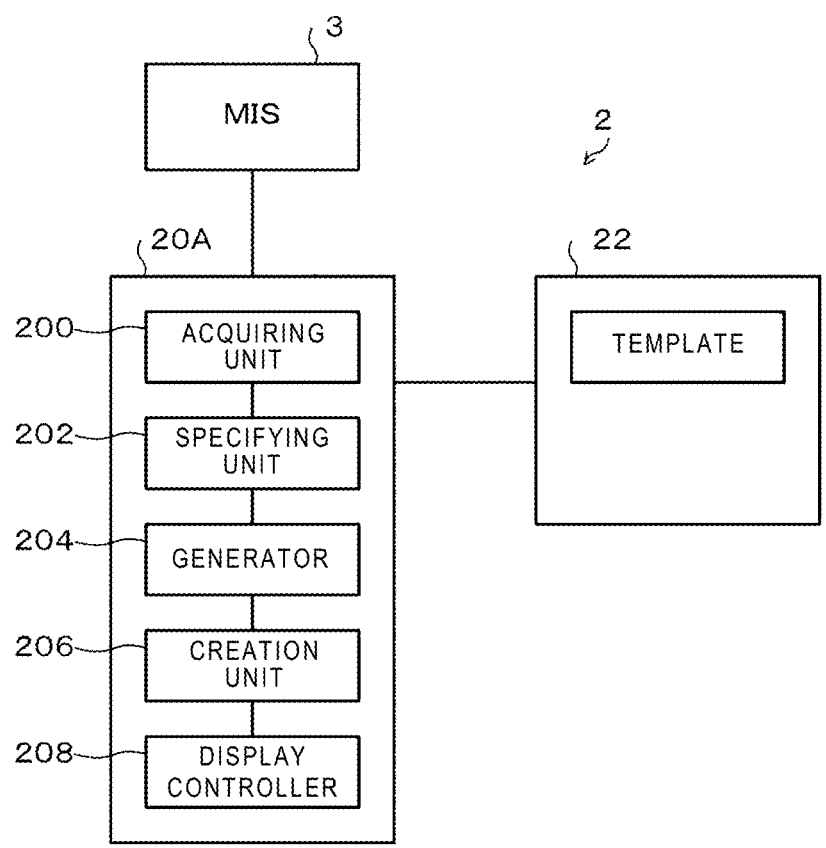
FIG. 4 is a block diagram illustrating an example of a functional configuration of the information processing device according to the exemplary embodiment.

FIG. 4 is a block diagram illustrating an example of a functional configuration of the information processing device 2 according to the present exemplary embodiment.

As illustrated in FIG. 4, the CPU 20A of the information processing device 2 includes functional units that function as an acquiring unit 200, a specifying unit 202, a generator 204, a creation unit 206, and a display controller 208.

The storage 22 according to the present exemplary embodiment stores template information applicable to the workflow information indicating the workflow of the print product (hereinafter referred to as "product workflow information"). The workflow of the print product may be referred to as a "product workflow". The template information is data in which for each process in manufacturing the print product, information indicating a unit of work performed in the process and parts processed and generated in the process are regarded as nodes, and a relationship between plural processes is regarded as a link between the nodes. For example, according to various conditions such as each type of the print product, each customer, and each condition of finishing of the print product, a process performed for manufacturing the print product, the part processed or generated in each process, and the relationship between the processes or a relationship between each process and the parts may be set as templates. For example, according to the exemplary embodiment, plural templates may be registered in advance for each assumed print product and an appropriate template is set according to a specification of an ordered print product from the registered plural templates. Thereby, the template can be used to set the process for manufacturing the print product. As a specific example, the plural templates are created in advance, the plural templates are stored in the storage 22, and the user may set, for example, an appropriate template from the plural templates stored in the storage 22 to use the set template. When the template is used in this way, the process for manufacturing the print product can be more easily set as compared with a case in which a relationship among (i) processes required for manufacturing the print product, (ii) the part processed in each process, and (iii) a next process for integrating the processed parts is designed from a beginning each time the print product is ordered.

Figure 5:
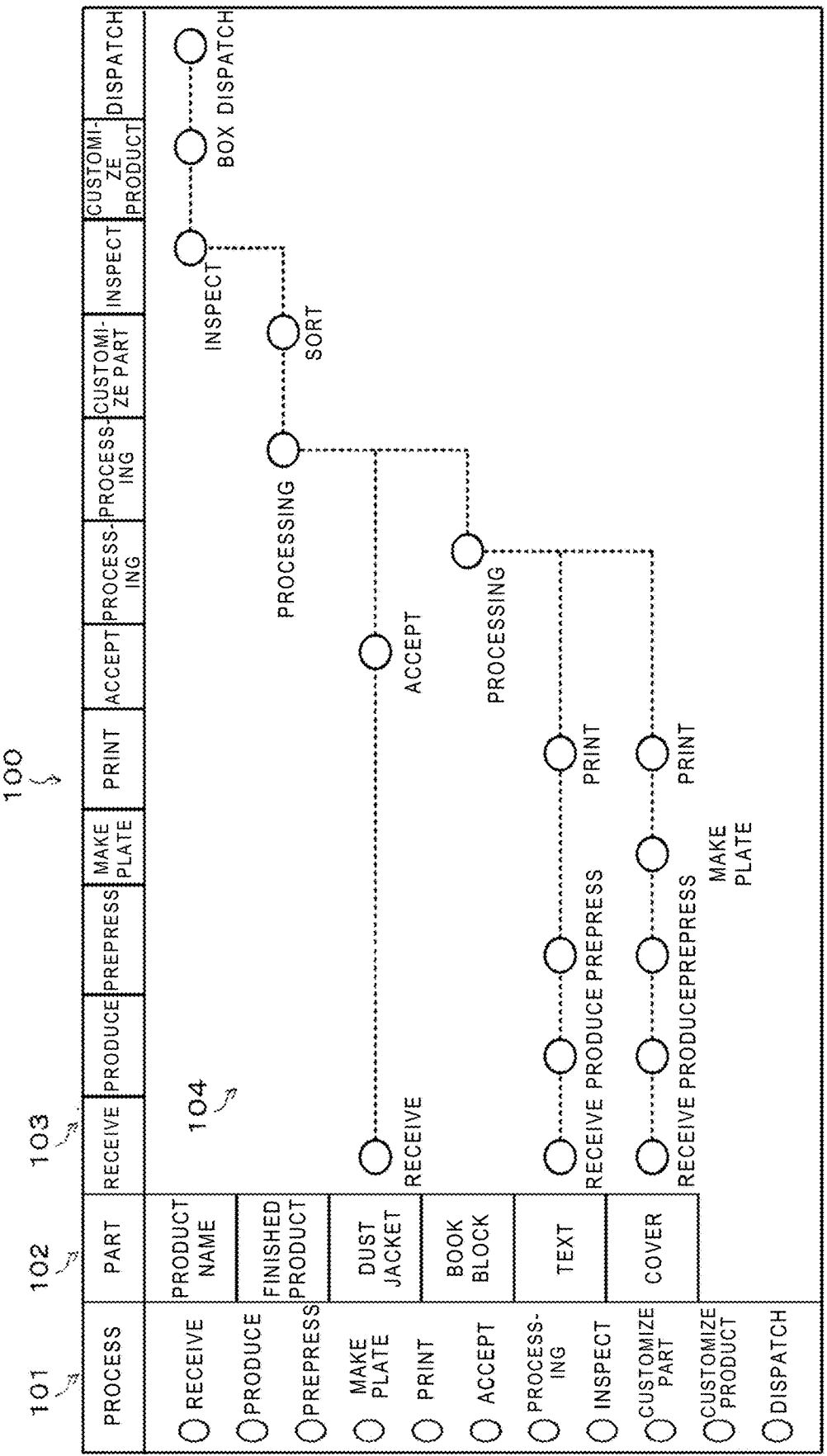
FIG. 5 illustrates an example of template information according to the exemplary embodiment.

FIG. 5 illustrates an example of the template information according to the present exemplary embodiment.

FIG. 5 illustrates a screen 100 as an example of the template information displayed on the display 26. The display controller 208 performs control of displaying the screen 100 on the display 26 using the template information.

The screen 100 includes display regions 101, 102, 103, and 104. The process in manufacturing the print product is displayed in the display region 101. The process illustrated in FIG. 5 is an example of work from receiving the order of the print product to dispatch of the print product, in manufacturing of the print product.

For example, "receive" indicates a work of receiving the request from the requester to manufacture at least a part of the print product. "Produce" indicates work of producing the original of the print product. "Prepress" indicates a work of performing the test printing before printing the print product. "Make plate" indicates a work of creating the printing plate for the printing. "Print" indicates a work of printing on the printing medium. "Accept" indicates a work of receiving the part or the product. "Processing" indicates a work of performing processing on the printed matter. "Inspect" indicates a work of inspecting the part or the product. "Customize part" indicates a general term for works of performing a special process and processing on the part. "Customize product" indicates a general term for works of performing a special process and processing on the part. "Dispatch" indicates a work of dispatching a print product that has been manufactured.

The display region 102 displays the parts of the print product. In the example illustrated in FIG. 5, displayed are (i) the parts included in the print product and (ii) the intermediate parts generated from the parts during manufacture of the print product. As examples of the part included in the print product, the "cover", the "text", and the "dust jacket" are illustrated. As examples of the intermediate part, a "book block" generated by combining the "cover" and the "text" and a "finished product" generated by combining the "book block" and the "dust jacket" are illustrated. The printed matter at a stage where the production is completed is illustrated as a "product name".

The display region 103 displays the works of the manufacturing process in manufacturing the print product. Information displayed in the display region 103 corresponds to the processes displayed in the display region 101.

The display region 104 displays the works in manufacturing the print product as nodes (circular figures in FIG. 5). That is, the work objects indicating the works in the processes from the "receive" to the "dispatch" displayed in the display region 101 are displayed as the nodes (circular figures in FIG. 5) in an order of the processes in manufacturing the print product. Among the work objects, the nodes indicating the works for the intermediate parts function as the intermediate objects.

For each of the plural parts, the nodes which are the work objects indicating the works included in the manufacturing process of the part are arranged in order of the works and displayed. The nodes indicating the work objects which are processed continuously are related such that the nodes have a relationship therebetween. FIG. 5 illustrates an example in which the nodes are related by connecting the nodes with dotted lines. A node that is an intermediate object indicating an intermediate part and nodes that are other work objects for plural parts used for generating the intermediate part are related (connected to each other) such that the node which is the intermediate object has a relationship with the nodes which are the other work objects.

Regarding the template information, plural pieces of template information are created in advance according to the number of parts constituting the print product and types of the processing. The plural pieces of template information are stored in the storage 22. Each of the plural pieces of template information is stored in association with identification information for identifying the template information. The identification information indicates, for example, a "workflow ID (IDentification)" and a "workflow name". Different identification information are allocated to the respective plural pieces of template information. That is, the template information is managed in association with the workflow ID and the workflow name.

The acquiring unit 200 acquires manufacturing information for manufacturing the print product.

In the present exemplary embodiment, for example, the information processing device 2 acquires information (hereinafter referred to as "MIS information") necessary for manufacturing the print product, from the MIS 3. The MIS information is, for example, information described in the XML format. The MIS information includes, for example, various information such as the workflow ID indicating the product workflow information of the print product, a part type ID indicating the part constituting the print product, and information indicating the part and a process such as processing performed on the print product. The processes and the work objects in manufacturing the print product may be specified based on the MIS information.

The specifying unit 202 specifies a type (pattern) of the manufacturing process using the MIS information acquired from the MIS 3. Here, the type (pattern) of the manufacturing process is information for specifying the manufacturing process by combining part information such as the number of parts included in the print product and information indicating the manufacturing process of each part. That is, the specifying unit 202 uses the MIS information to specify (i) the plural processes required from receiving the order of the print product to completion of the print product and (ii) the plural parts for manufacturing the print product.

The generator 204 generates the work objects and the intermediate objects indicating the works in manufacturing the print product based on the type of the manufacturing process specified by the specifying unit 202. Specifically, for each of the plural parts included in the print product, the work objects indicating the works including the processing performed to manufacture the part is generated. For the intermediate part generated by performing processing such as combining at least two parts among the plural parts, the intermediate object indicating the intermediate part is generated.

The creation unit 206 creates the product workflow information in which the work object and the intermediate object are related (connected), using the MIS information acquired from the MIS 3 and the work object and the intermediate object which are generated by the generator 204.

The creation unit 206 has an editing function of creating the product workflow information and changing a part of the product workflow information. The editing function will be described later.

The present exemplary embodiment describes a case in which the generator 204 and the creation unit 206 acquire, from the storage 22, template information matching the MIS information acquired from the MIS 3, to thereby generate the work object and the intermediate object and create the workflow of the print product. Specifically, among the MIS information acquired from the MIS 3, the template information matching the information indicating the type of the manufacturing process, that is, the number of parts included in the print product and the manufacturing process of each part is acquired from the storage 22.

When the plural pieces of template information match the MIS information acquired from the MIS 3, the plural pieces of template information may be used as candidate template information, and any one of the plural pieces of candidate template information may be selected.

The display controller 208 creates display information for displaying the product workflow information created by the creation unit 206 on the display 26, and performs control of displaying the created display information on the display 26.

The display controller 208 can perform display control of displaying the information obtained in each of the functional units including the acquiring unit 200, the specifying unit 202, the generator 204, and the creation unit 206, on the display 26.

When the processing for the intermediate part is not started in the product workflow information, the display controller 208 performs control of displaying the progress status of each of the at least two parts constituting the intermediate part.

Next, an action of the information processing device 2 will be described with reference to FIG. 6.

Figure 6:
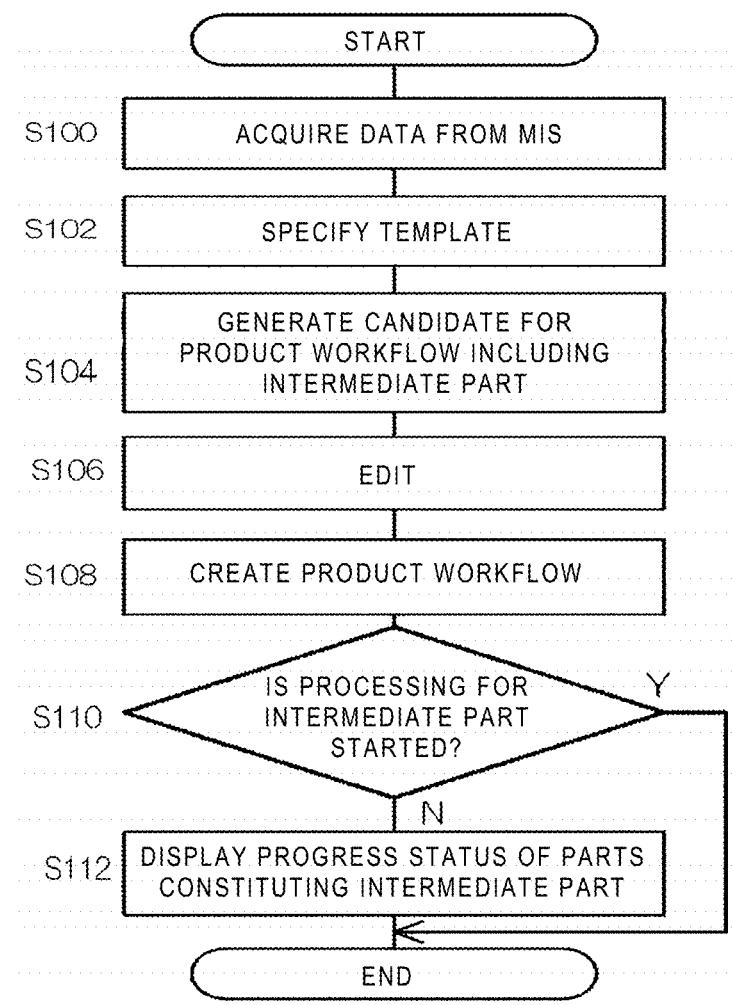
FIG. 6 is a flowchart of an example of an information processing program according to the exemplary embodiment.

FIG. 6 is a flowchart of an example of the information processing program 22A executed on the information processing device 2.

In the information processing device 2, when it is instructed to start the information processing program 22A, the CPU 20A functions as each of the functional units described above and executes the following steps.

In step S100 of FIG. 6, the acquiring unit 200 acquires the MIS information from the MIS 3. The MIS information is the information described in the XML format as described above. The MIS information includes information on the parts and the manufacturing processes in manufacturing the print product.

Next, an example of the MIS information will be illustrated.

```
<product_template_attributes>
        <product_wf_template_id>WFID_020</product_wf_template_id>
    <part_template_attributes>
        <part_type_id>ID020_1_1</part_seq>
            +attribute information of each process
    </part_template_attributes>
</product_template_attributes>
...
```

Figure 9:
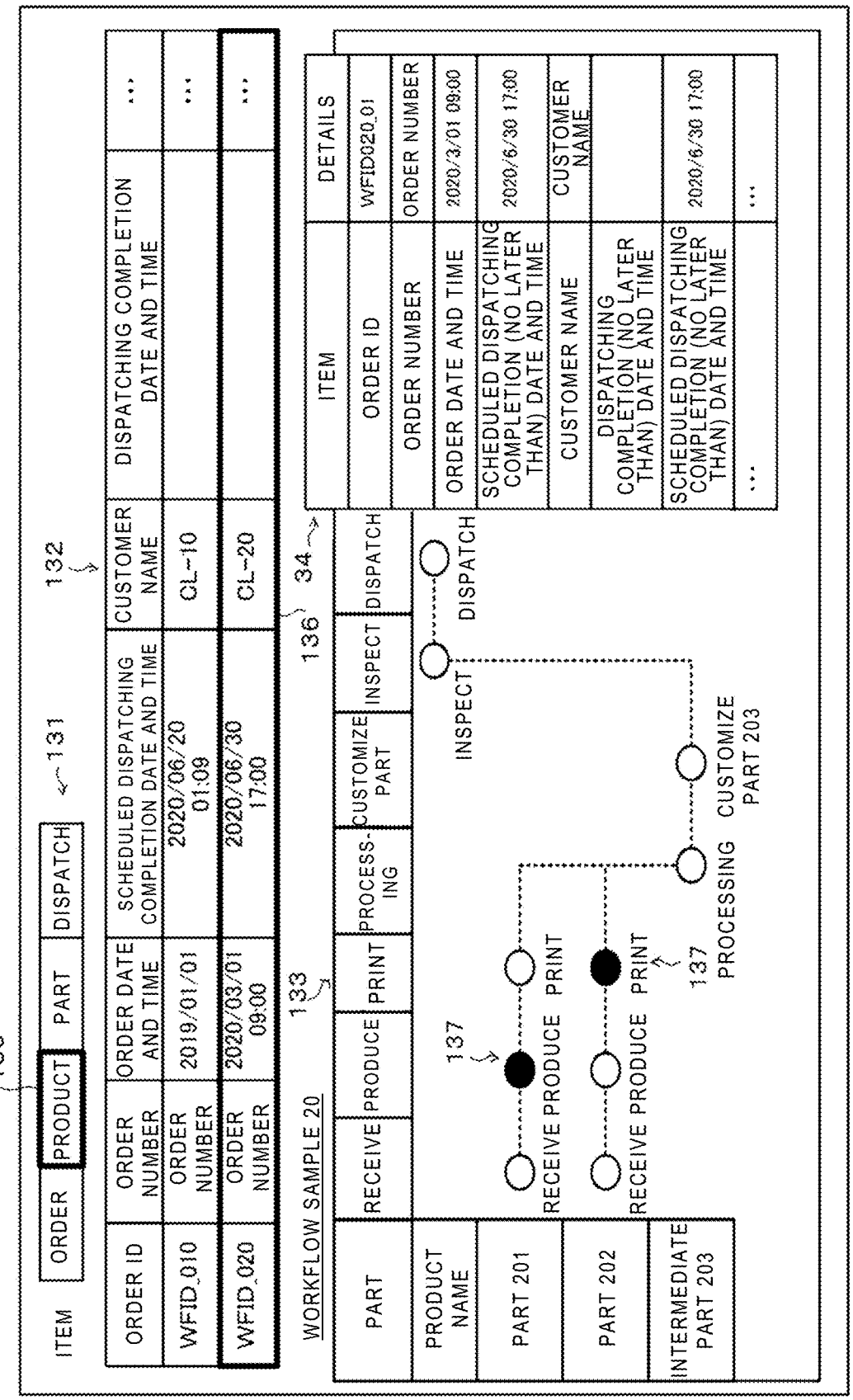
FIG. 9 illustrates an example of workflow information of the print product according to the exemplary embodiment.

The MIS information indicates that the workflow ID of the template information indicating the template specified for the print product is "WFID_020" (also see FIG. 9). The part included in the template information is "ID020_1_1". Details of each process for the part, that is, a work object is indicated as "attribute information of each process".

In step S102, the specifying unit 202 specify the type of the manufacturing process using the MIS information to specify the template information for generating the candidate product workflow information. In step S102, the workflow ID included in the MIS information is detected, and the template information is specified based on the detected workflow ID. The specified template information is an example of a "matching template" of the present disclosure.

In step S104, the generator 204 and the creation unit 206 generate a candidate for a product workflow (product workflow information) including the intermediate part. The candidate for the product workflow may be referred to as a "product workflow candidate". In step S104, first, the generator 204 generates the work object and the intermediate object which indicate the works in manufacturing the print product based on the specified type of the manufacturing process. Then, the creation unit 206 uses the MIS information, the work objects, and the intermediate object to generate a candidate for the product workflow including the intermediate part in which the work objects and the intermediate object are connected.

Specifically, the template information matching the workflow ID included in the MIS information is acquired from the storage 22, to generate the work objects and the intermediate object, and create the product workflow candidate in which the nodes are connected.

Figure 7:
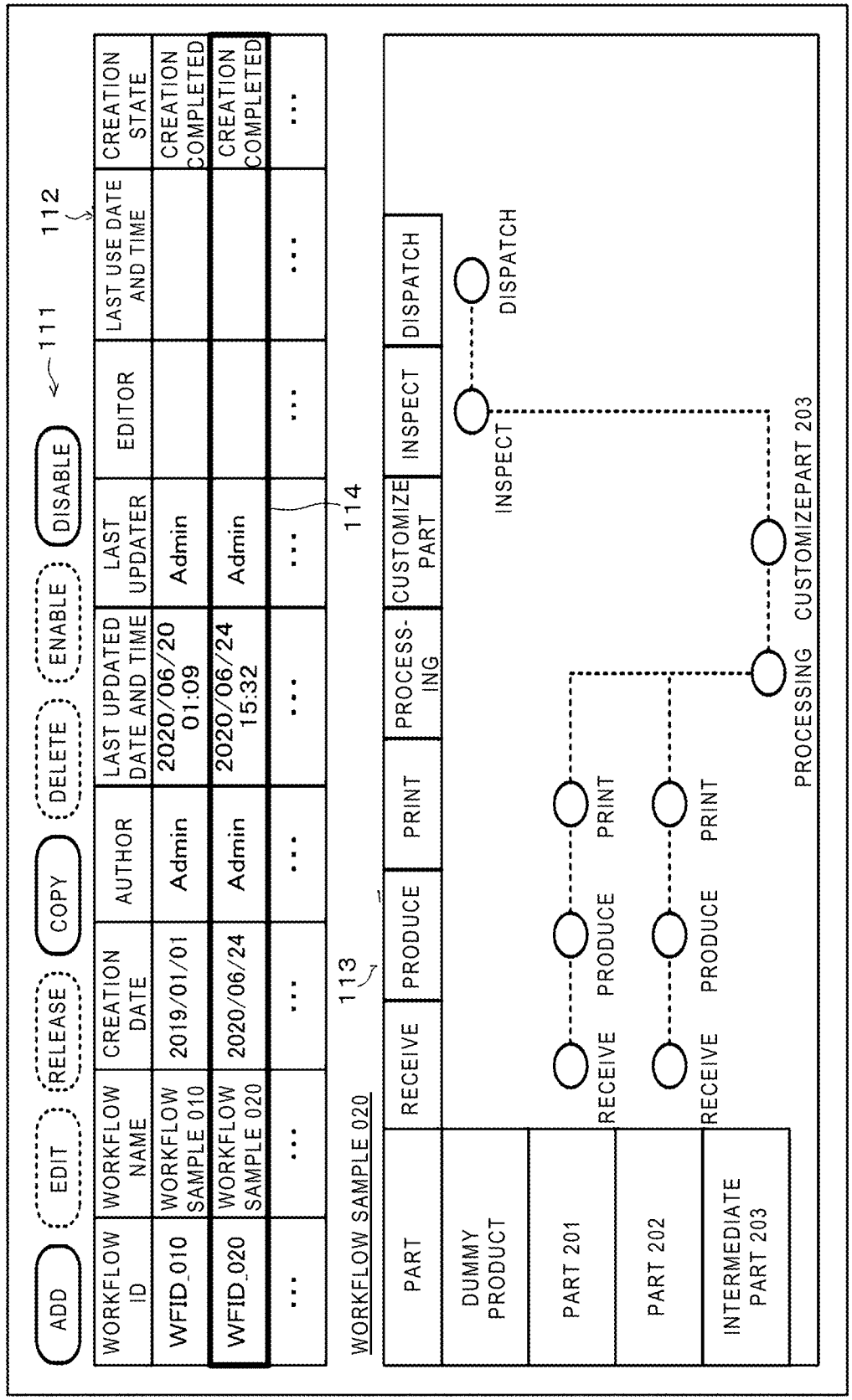
FIG. 7 illustrates an example of the template information according to the exemplary embodiment.

FIG. 7 illustrates an example of the template information that is the product workflow candidate.

FIG. 7 illustrates a screen 110 as an example of the template information displayed on the display 26. The display controller 208 performs control of displaying the screen 110 on the display 26 using the template information.

The screen 110 includes display regions 111, 112, and 113. The display region 111 displays instruction buttons for creating the product workflow. In the example illustrated in FIG. 7, the instruction buttons of "add", "edit", "release", "copy", "delete", "enable", and "disable" are displayed. These instruction buttons are instructed by an operation of the user of the operation unit 28.

The "add" instruction button is a button for instructing to add a new product workflow. The "edit" instruction button is a button for instructing a start of editing an existing product workflow. The "release" instruction button is a button for instructing release of editing the product workflow being edited. The "copy" instruction button is a button for instructing to copy an existing product workflow to create the same workflow. The "delete" instruction button is a button for instructing to delete a selected product workflow. The "enable" instruction button is a button for setting a selected product workflow to an enabled state. The "disable" instruction button is a button for setting a selected product workflow from the enabled state to a disabled state.

The display region 112 displays a list of the template information stored in the storage 22. In the list of the example illustrated in FIG. 7, various information included in the template information including the workflow ID and the workflow name for identifying the template information are associated with labels indicating items.

Similar to FIG. 5, the display region 113 displays the respective works of the manufacturing process in the selected template information. Specifically, the work objects in the selected template information (information in a region surrounded by a thick frame line 114 in the display region 112) are displayed as the nodes (circular figures). Among the work objects, the nodes indicating the works for the intermediate parts function as the intermediate objects. In this case, the intermediate object includes an intermediate processing object and an intermediate work object. The intermediate processing object indicates the processing for the plural parts ("processing" in the example of FIG. 7). The intermediate work object indicates processing for the generated intermediate part ("customize part 203" in the example of FIG. 7).

In step S106, the creation unit 206 performs edit processing on the product workflow candidate. Specifically, when any of the instruction buttons illustrated in FIG. 7 is instructed by the user operating the operation unit 28, the processing of step S106 is started. For example, when the edit button is instructed, processing of editing to change a part of the product workflow candidates is started.

Figure 8:
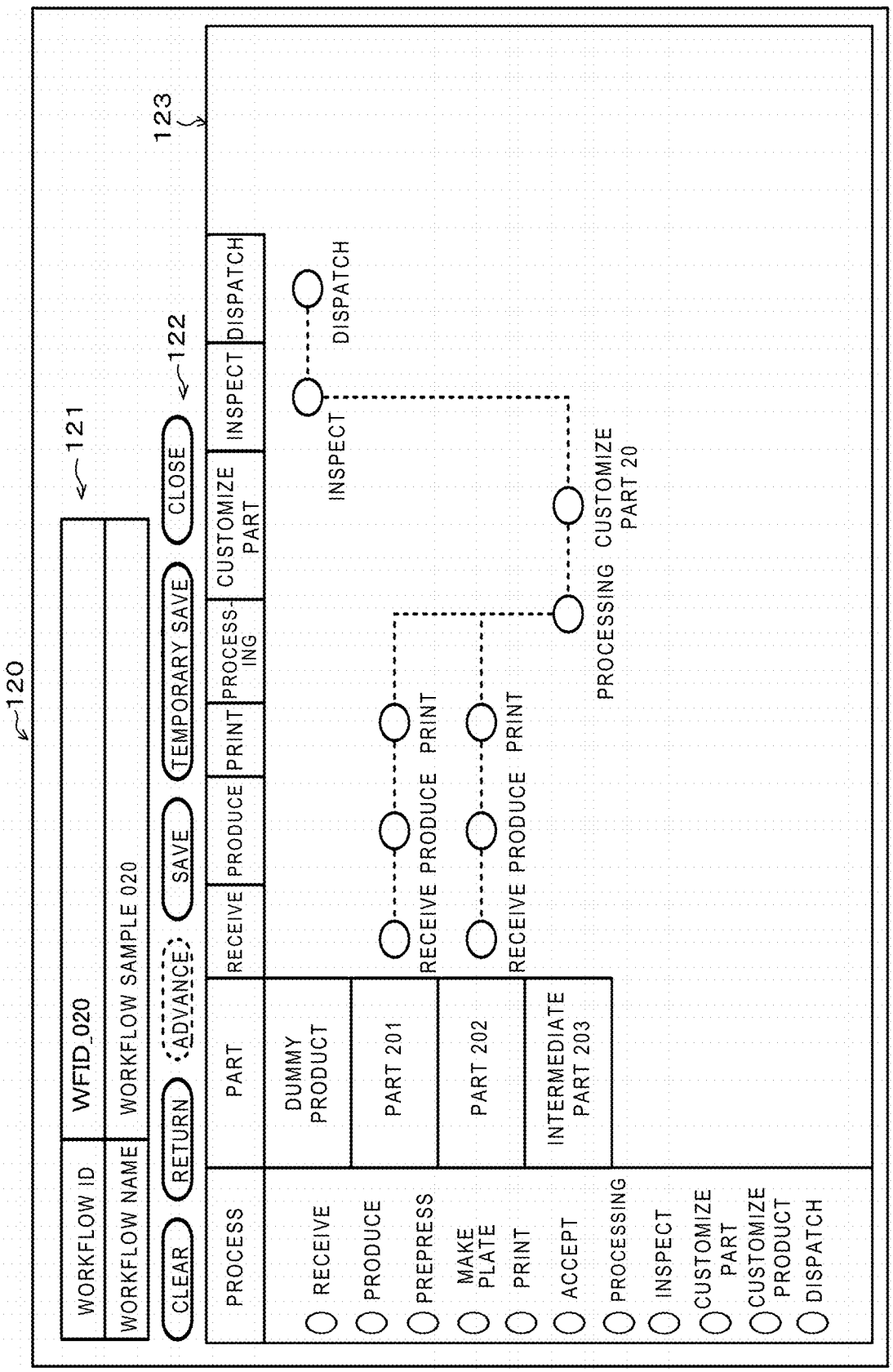
FIG. 8 illustrates an example of a screen in edit processing according to the exemplary embodiment.

FIG. 8 illustrates an example of a screen in the edit processing.

FIG. 8 illustrates, as an example, a screen 120 in which the edit button is instructed to edit and change a part of the product workflow candidate. The display controller 208 performs control of displaying the screen 120 on the display 26 during the editing.

The screen 120 includes display regions 121, 122, and 123. The display region 121 displays the workflow ID and the workflow name that indicate template information being edited (that is, the product workflow candidate).

The display region 122 displays instruction buttons for instructing an editing status for the template information being edited. In the example illustrated in FIG. 8, the instruction buttons of "clear", "return", "advance", "save", "temporary save", and "close" are displayed. These instruction buttons are instructed by an operation of the user of the operation unit 28.

The "clear" instruction button is a button for instructing to delete processing (editing operation) performed on the product workflow candidate being edited. The "return" instruction button is a button for instructing to cancel a previously processed editing operation and return to a previous state. The "advance" instruction button is a button for instructing to return the canceled editing operation from a state returned by the "return" instruction button. The "save" is a button for instructing to save the product workflow candidate, that is, to store the product workflow candidate in the storage 22 in a current editing work state. The "temporarily save" instruction button is a button for instructing to temporary save the product workflow candidate in the RAM 20B in the current editing work state. The "close" instruction button is a button for instructing to close the screen 120 after finishing the edit processing of the product workflow candidate being edited.

Similar to FIG. 5, the display region 123 displays the work objects in the template information being edited as the nodes (circular figures). Among the work objects, the nodes indicating the works for the intermediate parts function as the intermediate objects.

In the edit processing, any of the work objects displayed in the display region may be deleted and any of the work objects displayed in a process column may be added (for example, drag a figure).

Next, in step S108, the creation unit 206 creates the edited product workflow candidate as a product workflow. That is, when the "close" instruction button illustrated in FIG. 8 is instructed and saving is completed, the product workflow information indicating the product workflow candidate is created. The created product workflow information is stored in the storage 22.

FIG. 9 illustrates an example of the product workflow information.

FIG. 9 illustrates a screen 130 as an example of the product workflow information displayed on the display 26. The display controller 208 performs control of displaying the product workflow information on the display 26. By this control, for example, an image of the screen 130 is displayed on the display 26.

The screen 130 includes display regions 131, 132, 133, and 134. The display region 131 displays instruction buttons related to a state of the product workflow being displayed. In the example illustrated in FIG. 9, the instruction buttons of "order", "product", "part", and "dispatch" are displayed. These instruction buttons are instructed by an operation of the user of the operation unit 28.

The "order" instruction button indicates an instruction button for instructing to display a product workflow in which a manufacturing state of a print product is an ordering stage. The "product" instruction button indicates an instruction button for instructing to display a product workflow of a print product. The "part" instruction button indicates an instruction button for instructing to partially display parts in a product workflow of a print product. The "dispatch" instruction button indicates an instruction button for instructing to display a product workflow in which the manufacturing stage of a print product is a dispatching stage.

The product workflow information read from the storage 22 in accordance with an instruction button instructed in the display region 131 is displayed in a list form in the display region 132. The list in the example illustrated in FIG. 9 displays product workflow information corresponding to the instructed instruction button (specifically, the instruction button indicating the "product" surrounded by a thick frame line 135 in the display region 131).

Similar to FIG. 5, the display region 133 displays work objects corresponding to an instructed product workflow (specifically, the product workflow information surrounded by a thick frame line 136 in the display region 132) as nodes (circular figures). Among the work objects, the nodes indicating the works for the intermediate parts function as the intermediate objects.

Specifically, in the product workflow information in the example illustrated in FIG. 9, nodes (work objects) in a manufacturing process of each of a part 201 and a part 202 are generated. Nodes (intermediate objects) in intermediate processes of an intermediate part 203 that is a product-in-process obtained by combining the part 201 and the part 202 are generated. Then, the process continues to a node indicating an inspection process and a node indicating a dispatching process in order. Therefore, the product workflow information is created in which from the receiving process to the dispatching process, the nodes (working objects) in the manufacturing process of each of the part 201 and the part 202 and the nodes (intermediate objects) of the intermediate processes of the intermediate part 203 are connected.

The display region 134 displays the MIS information acquired from the MIS 3. FIG. 9 illustrates a case where a table in which information indicating "items" and "details" are associated with each other is displayed as a display example of the MIS information.

The product workflow information is displayed together with work status information indicating a progress status of a work which is based on the current product workflow information, in cooperation with the MIS information in the MIS 3. Specifically, the display controller 208 performs control of displaying a progress level of each of the work objects indicated by the MIS information on the display 26.

The display region 133 in FIG. 9 illustrates a case in which for the print product and the parts, the print product is indicated by a "product name", and the parts are indicated by the "part 201", the "part 202", and the "intermediate part 203". In this case, as the work status information, a display form of a node corresponding to a current progress state is changed. For example, when the MIS information provided from the MIS 3 includes information that the part 201 is in a production stage and the part 202 is in a printing stage, each node is displayed in a different display form from the other nodes. Specifically, the node indicating the production process of the part 201 and the node indicating the printing process of the part 202 have a display form 137 (a display form with a black circular figure) different from that of the other nodes. At this stage, the intermediate part 203 is generated by combining the part 201 and the part 202. Therefore, it is possible to confirm that the intermediate part 203 has not been generated. By changing the display form of the node in this way, it is possible to confirm the progress state of the work in the workflow of the print product.

Examples of changing the display form of the node as described above include changing a shape of an image that is displayed as the node, changing a color of the node, and changing the node by adding an annotation image.

As described above, (i) the plural manufacturing processes from the order of the print product to the completion of the print product and (ii) the plural parts are specified, and for the intermediate part generated by processing parts, the intermediate object indicating the intermediate part is generated. Then, the product workflow information is created in which the work objects are arranged in order of the works and displayed, the work objects indicating the works processed continuously are connected and displayed, and the intermediate object and the work objects are connected and displayed. Accordingly, when the manufacturing process is managed from the order of the print product to the completion of the print product, it is possible to easily know which parts constitute the intermediate part.

Next, in step S110, the creation unit 206 determines whether the processing for the intermediate part is started. When it is determined that the processing for the intermediate part is started (in a case of the affirmative determination), the status of the intermediate part is set to "ready", and a series of processing by the present information processing program 22A is ended. When it is determined that the processing for the intermediate part is not started (in a case of the negative determination), the process proceeds to step S112.

In step S112, the display controller 208 perform control of displaying, on the display 26, the progress status of each of the at least two parts constituting the intermediate part in the product workflow created in step S108. The series of processing by the information processing program 22A end.

Next, a method of controlling a progress of an intermediate part according to the present exemplary embodiment will be specifically described with reference to FIGS. 10A to 19.

Figure 10A:
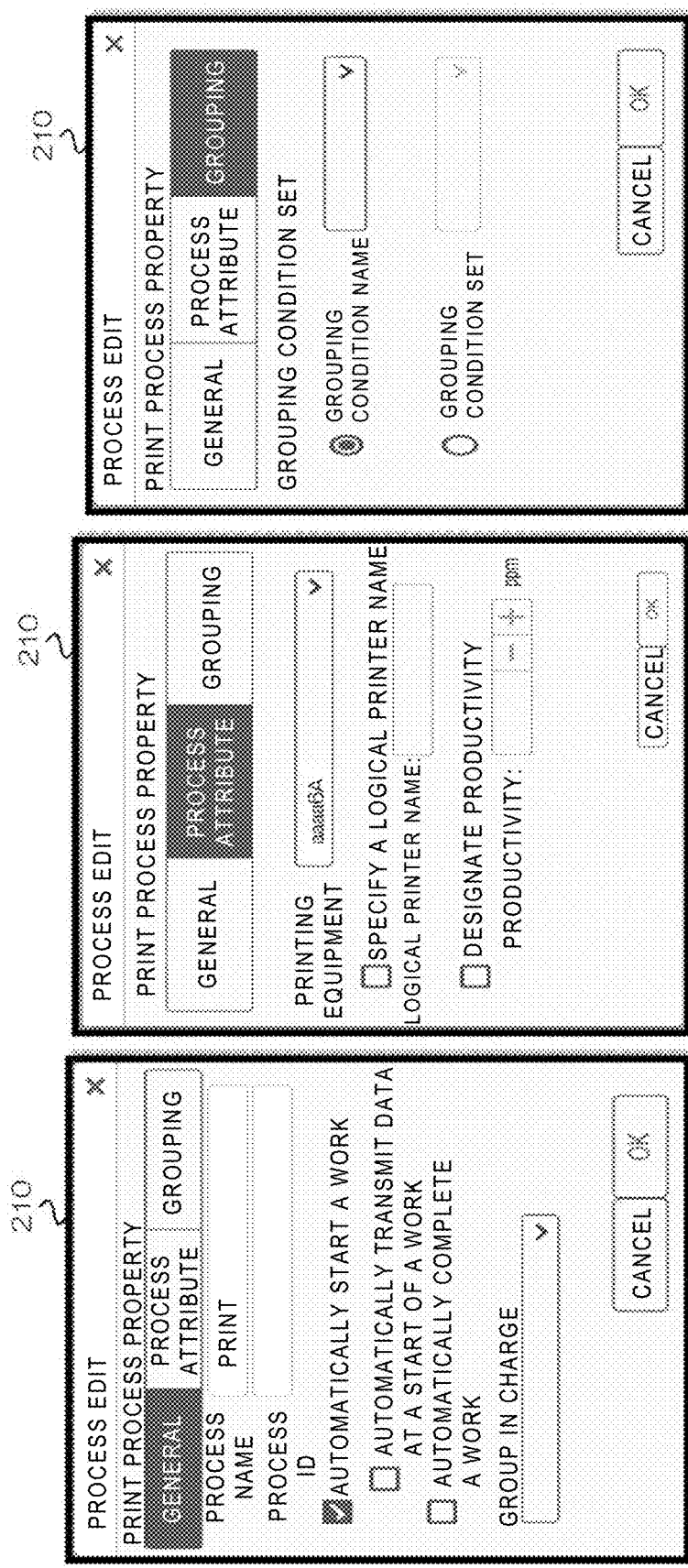
FIGS. 10A to 10C illustrate an example of a process edit screen according to the exemplary embodiment.
Figure 10B:
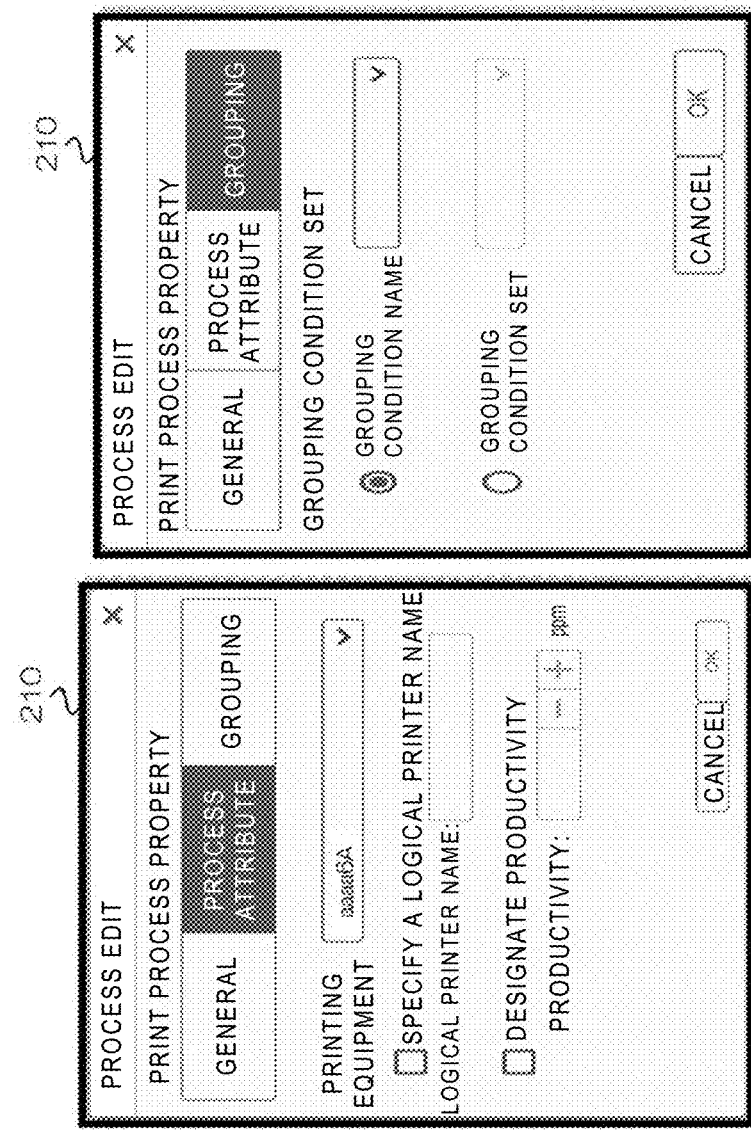
Figure 10C:
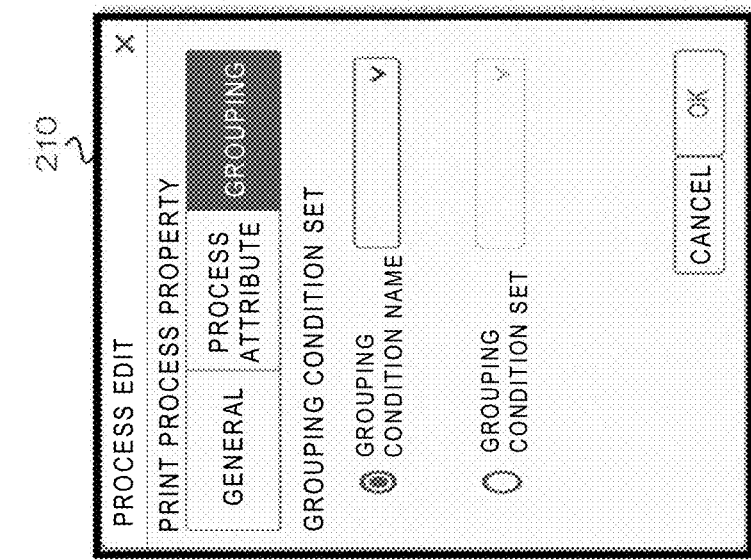

FIGS. 10A to 10C illustrate an example of a process edit screen 210 according to the present exemplary embodiment.

The process edit screen 210 in FIG. 10A illustrates a state in which a "general" tab is selected. In this "general" tab, "automatically start a work", "automatically transmit data at a start of a work", and "automatically complete a work" may be designated as setting items in each process. In this case, by the information processing device 2 linking with the MIS 3 (which is an external system), each process may be processed completely automatically.

The process edit screen 210 in FIG. 10B illustrates a state in which a "process attribute" tab is selected. In this "process attribute" tab, a printing equipment (printer) used in the process can be designated.

The process edit screen 210 in FIG. 10C illustrates a state in which a "grouping" tab is selected. In this "grouping" tab, a grouping condition for grouping parts can be designated.

Figure 11:
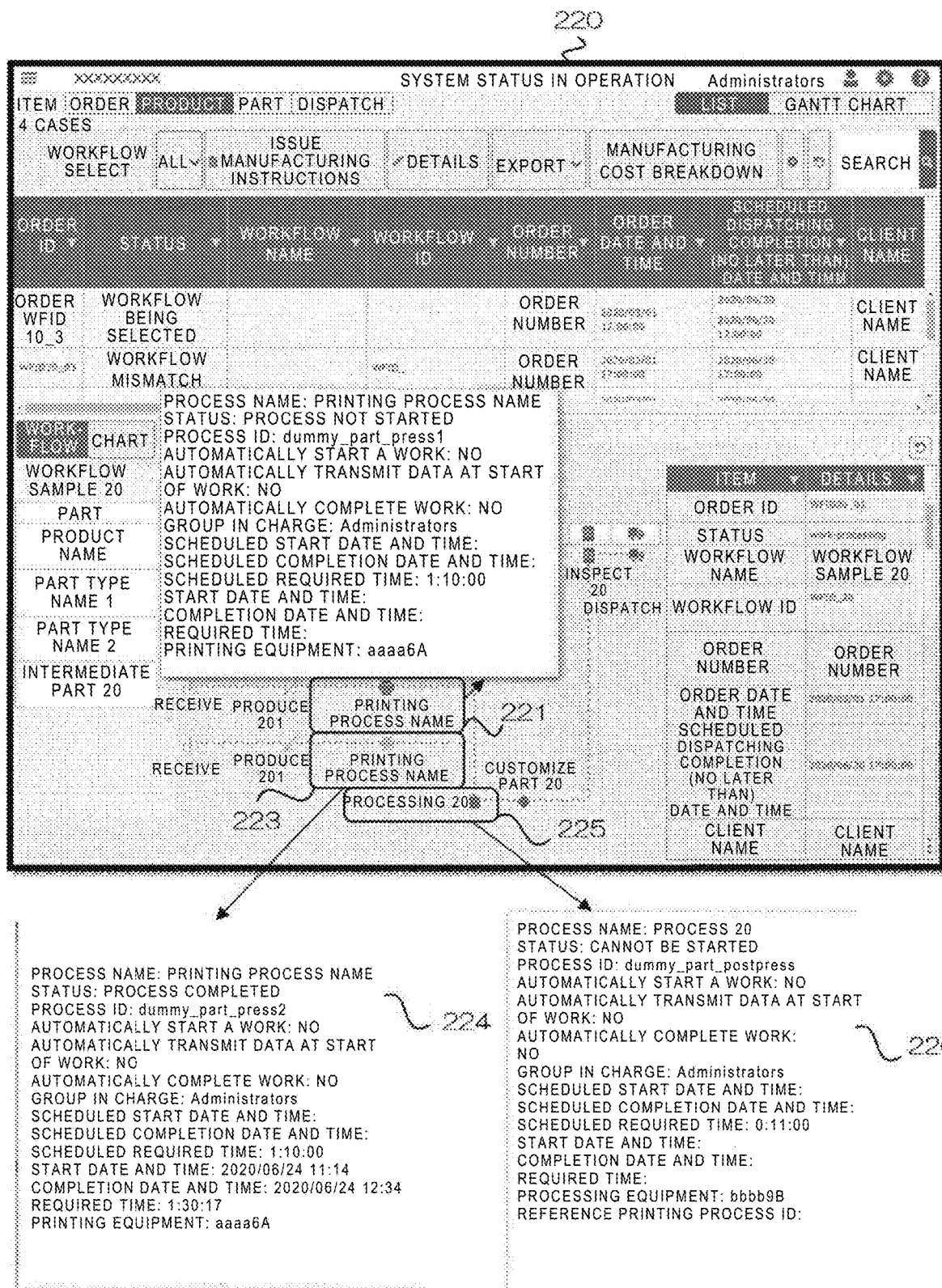
FIG. 11 illustrates an example of a workflow information display screen according to the exemplary embodiment.

FIG. 11 illustrates an example of a workflow information display screen 220 according to the present exemplary embodiment.

In the workflow information display screen 220 illustrated in FIG. 11, a product workflow is displayed. In the product workflow, work objects in the manufacturing processes of the parts of a "part type name 1" and a "part type name 2" are generated. An intermediate object in an intermediate process for an "intermediate part 20" that is a product-in-process obtained by combining the parts of the "part type name 1" and the "part type name 2" is generated.

The work object of the manufacturing process for the part of the "part type name 1" includes a work object 221 represented by a "printing process name". The work object 221 is associated with work attribute information 222 including status information of the corresponding part. The work attribute information 222 may pop-up when the work object 221 is designated. Similarly, a work object of the manufacturing process for the part of the "part type name 2" includes a work object 223 represented by a "printing process name".

The work object 223 is associated with work attribute information 224 including status information of the corresponding part. The work attribute information 224 may pop-up when the work object 223 is designated. The intermediate object of the intermediate process for the intermediate part "intermediate part 20" includes an intermediate object 225 represented by "processing 20". The intermediate object 225 is associated with work attribute information 226 including status information of the corresponding intermediate part. The work attribute information 226 may pop-up when the intermediate object 225 is designated. The work object 221, the work object 223, and the intermediate object 225 are displayed, for example, as icons.

As described above, the CPU 20A functions as the display controller 208. When processing for the intermediate part is not started in the product workflow, the CPU 20A performs control of displaying a progress status of each of at least two parts constituting the intermediate part. Specifically, in the example of FIG. 11, referring to the work attribute information 226 of the "intermediate part 20" that it the intermediate part, the status is displayed as "not ready". In this case, the processing for the "intermediate part 20" that is the intermediate part is not started. Then, the "intermediate part 20", which is the intermediate part, includes the two parts of the "part type name 1" and the "part type name 2". When the final process for each part is not completed, first processing for the intermediate part remains "not ready". In the example of FIG. 11, referring to the work attribute information 222 of the "part type name 1" that is one of the two parts, the status is displayed as "process not started". Further, referring to the work attribute information 224 of the "part type name 2" that is the other of the two parts, the status is displayed as "process completed". That is, the progress status of each of the two parts constituting the intermediate part is displayed.

In this case, the CPU 20A specifies a part and a process that cause processing for the intermediate part to be unable to start, from the at least two parts constituting the intermediate part in the product workflow. In the example of FIG. 11, the status of the "part type name 1" that is the one of the two parts is "process not started". Therefore, the part represented by the "part type name 1" is specified as a cause of the processing for the intermediate part "intermediate part 20" being unable to start. A process represented by the "printing process name" is specified as the cause of the processing being unable to start.

Figure 12A:
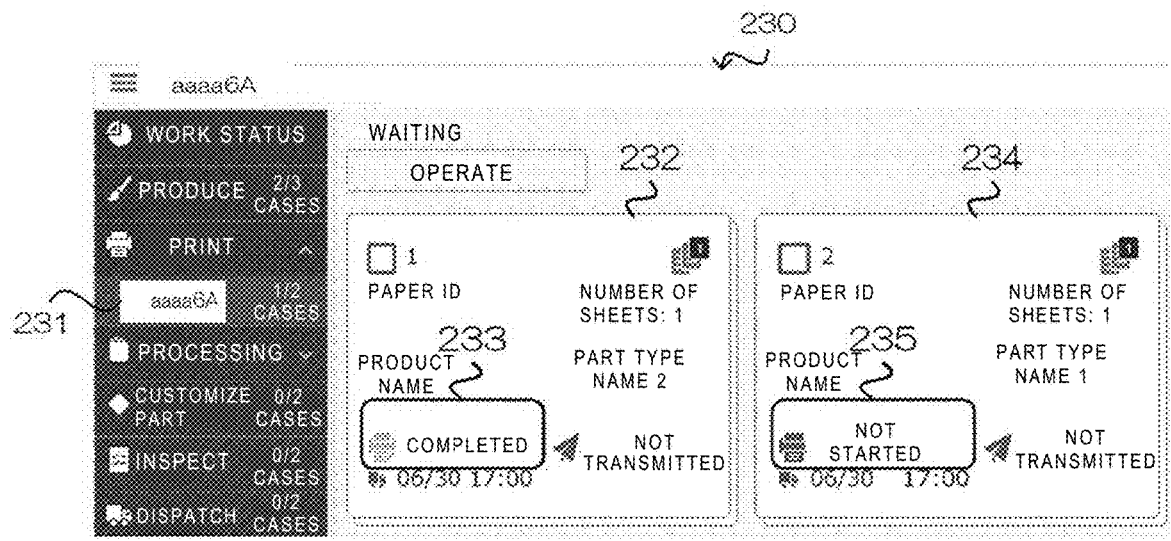
FIG. 12A illustrates an example of a work status screen of a printing device according to the exemplary embodiment.
Figure 12B:
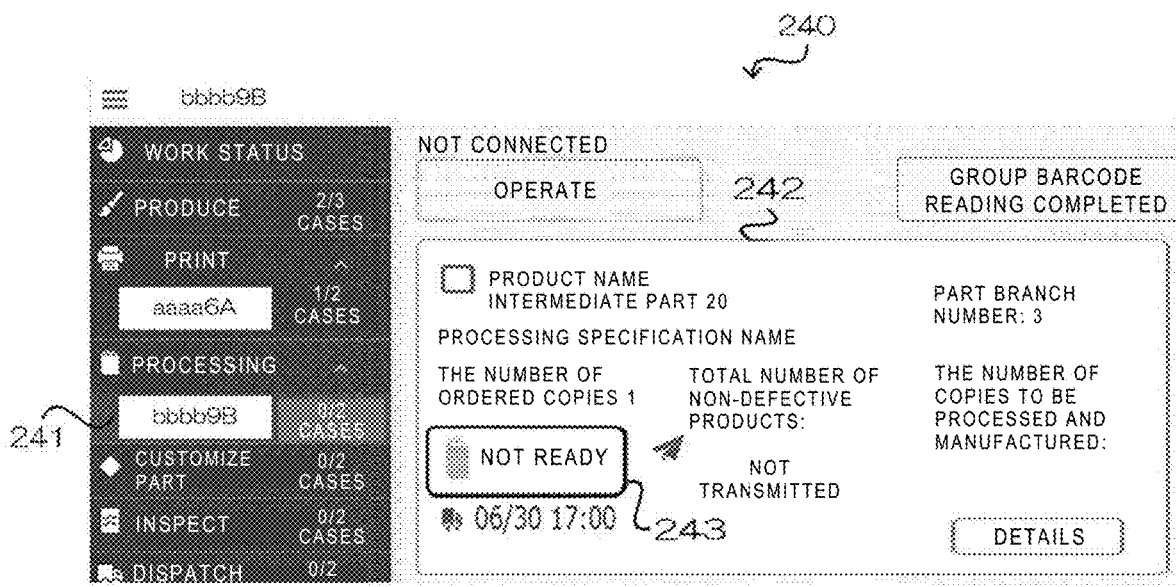
FIG. 12B illustrates an example of a work status screen of a processing device according to the exemplary embodiment.

FIG. 12A illustrates an example of a work status screen 230 of a printing device according to the present exemplary embodiment. FIG. 12B illustrates an example of a work status screen 240 of the processing device according to the present exemplary embodiment.

In the work status screen 230 illustrated in FIG. 12A, a work status of a printing device (printing equipment) "aaaa6A" used for printing the parts of the "part type name 1" and the "part type name 2" is managed. In the work status screen 230, when an item 231 related to "aaaa6A" is selected, work status information 232 corresponding to the "part type name 2" and work status information 234 corresponding to the "part type name 1" are displayed. In the work status information 232 corresponding to the "part type name 2", a status 233 is displayed as "completed". In the work status information 234 corresponding to the "part type name 1", a status 235 is displayed as "not started". The status 233 of the work status information 232 corresponds to the status of the work attribute information 224 illustrated in FIG. 11 described above. The status 235 of the work status information 234 corresponds to the status of the work attribute information 222 illustrated in FIG. 11 described above.

In the work status screen 240 illustrated in FIG. 12B, a work status of a processing device (processing equipment) "bbbb9B" used for processing the intermediate part of "intermediate part 20" is managed. In the work status screen 240, when an item 241 related to "bbbb9B" is selected, work status information 242 corresponding to the "intermediate part 20" is displayed. In the work status information 242 corresponding to the "intermediate part 20", a status 243 is displayed as "not ready". The status 243 of the work status information 242 corresponds to the status of the work attribute information 226 as illustrated in FIG. 11 described above.

Figure 13:
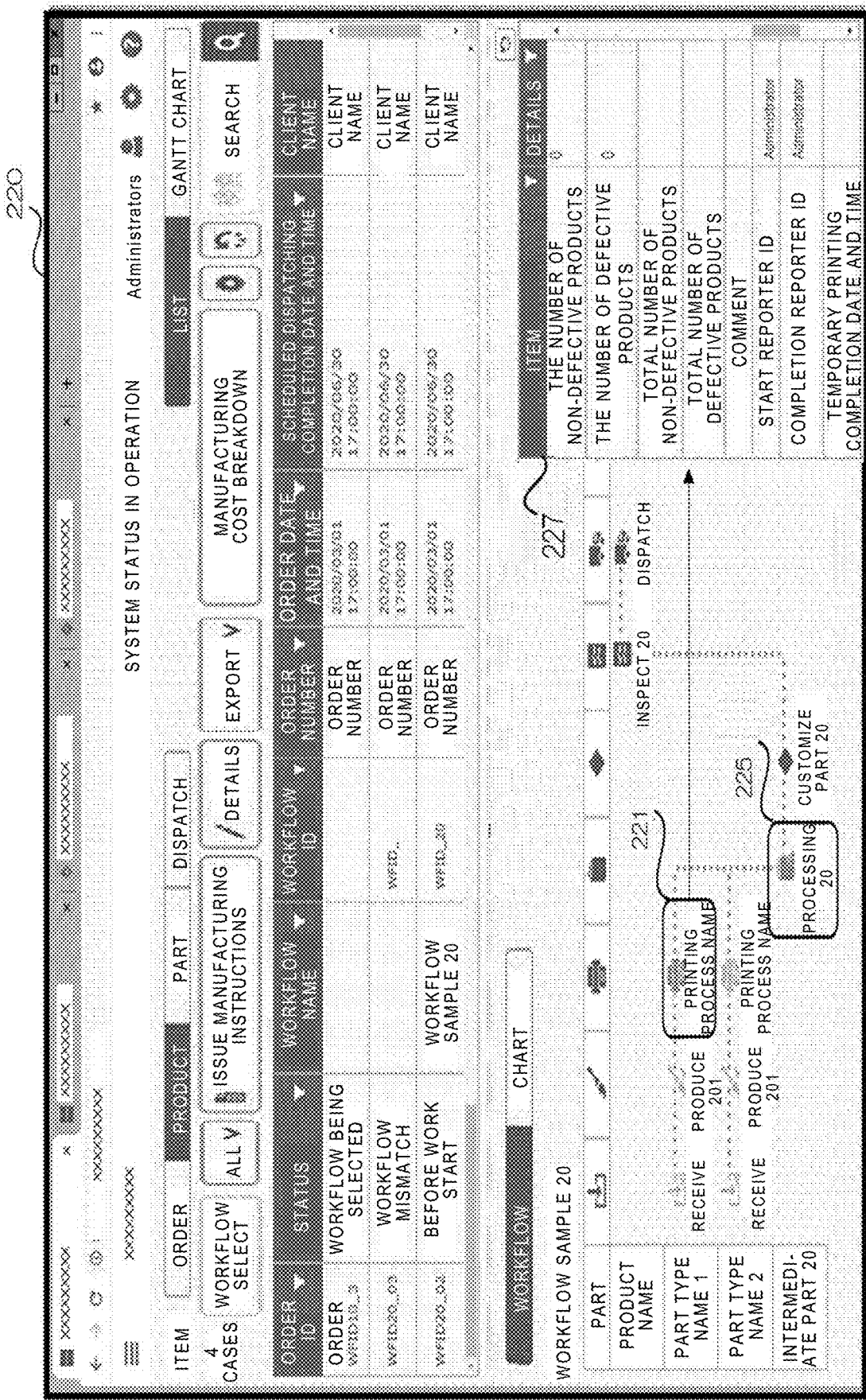
FIG. 13 illustrates another example of the workflow information display screen according to the exemplary embodiment.

FIG. 13 illustrates another example of the workflow information display screen 220 according to the present exemplary embodiment.

In the workflow information display screen 220 illustrated in FIG. 13, similar to the example of FIG. 11 described above, the work object 221 represented by the "printing process name" of the "part type name 1" and the intermediate object 225 represented by the "processing 20" for the "intermediate part 20" are displayed. Detail information 227 is associated with the work object 221. In the detail information 227, a contact address (for example, an e-mail address) of an administrator is managed. For example, a "start reporter ID" and a "completion reporter ID" of the detail information 227 are associated with the e-mail address of the administrator. The start report ID is an ID of a person to whom start of a process of interest is to be reported. The completion reporter ID is an ID of a person to whom completion of a process of interest is to be reported.

Here, as described above, the part represented by the "part type name 1" is specified as the cause of the processing for the intermediate part represented by the "intermediate part 20" being unable to start. In this case, the CPU 20A may perform control of notifying the administrator who manages the process for the part that is the cause of the processing for the intermediate part being unable to start, that the process is delayed. Specifically, the e-mail address of the administrator is acquired from the detail information 227, and a message such as "the xx process for the part xx is delayed. Please adjust the process" is automatically transmitted to the acquired e-mail address.

Further, in the example illustrated in FIG. 13, the work object 221 and the intermediate object 225 are delayed with respect to estimated completion. In this case, for example, a color of an icon representing the work object 221 (for example, a printer icon) and a color of an icon representing the intermediate object 225 (for example, a printer icon) may be changed to perform warning display. The warning display is not limited to changing the color of the icon, but may be in a form such as adding an exclamation mark to the icon. Accordingly, what process for what part is delayed can be known at a glance.

Figure 14:
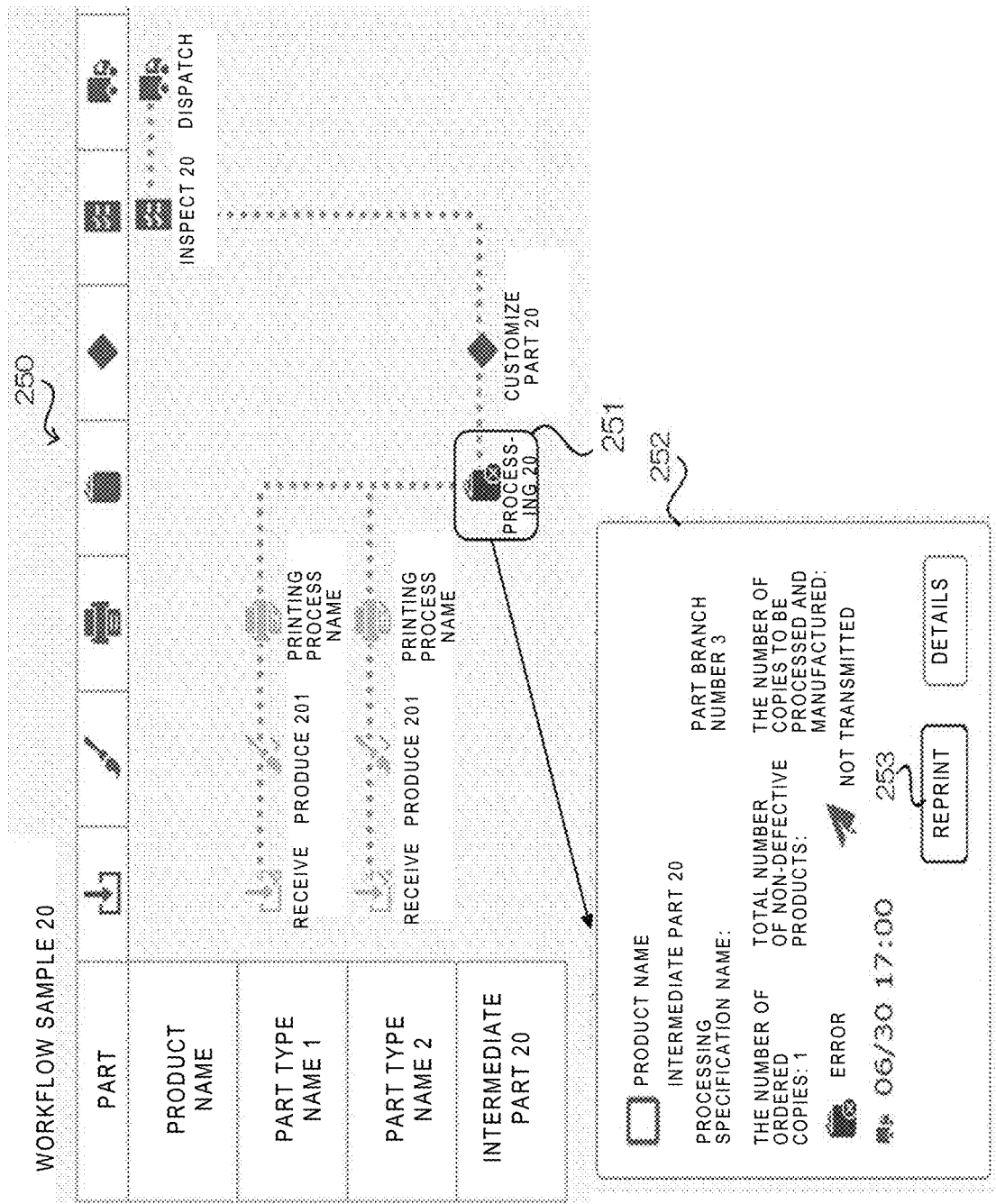
FIG. 14 illustrates an example of a product workflow display region in the workflow information display screen according to the exemplary embodiment.

FIG. 14 illustrates an example of a product workflow display region 250 in the workflow information display screen 220 according to the present exemplary embodiment.

In the product workflow display region 250 illustrated in FIG. 14, the product workflow is displayed. The product workflow includes an intermediate object 251 represented by the "processing 20" for the "intermediate part 20". An x mark is attached to an icon representing the intermediate object 251. The x mark indicates that some error has occurred in the process for the intermediate part represented by the "intermediate part 20". In this case, for example, a color of the icon representing the intermediate object 251 may be changed to perform the warning display.

Here, a part that fails to be processed in the "processing 20" is retroactively generated. At this time, a process of retroactively generating the part that fails to be processed is added as a process different from the "printing process name" of the "part type name 1" or the "printing process name" of the "part type name 2". It is noted that the "printing process name" indicates a process of printing a part. Then, the management is performed with a total number of non-defective products obtained by adding (i) the number of copies that are printed in the added process and (ii) the number of copies that are successfully processed in the "processing 20". For example, it is assumed that the number of copies of the ordered print product is 100, and the number of copies that are successfully processed in the "processing 20" is 50, and the number of copies that fail to be processed in the "processing 20" is 50. When the part of the "part type name 2" needs to be reprinted 50 copies in order to reprocess the 50 copies, which fail to be processed, in the "processing 20", a "printing process name" (see FIG. 17 to be described later) is added as a process different from the "printing process name" of the "part type name 2", and 50 copies of the part of the "part type name 2" are printed.

When an error occurs in the intermediate part in the product workflow, the CPU 20A specifies the number of copies to be reprocessed, for each of the at least two parts constituting the intermediate part. For example, a work status dialog 252 corresponding to the intermediate object 251 is displayed. In the work status dialog 252, a status is displayed as "error", and an instruction button 253 of "reprint" is displayed. When the instruction button 253 of "reprint" is instructed by the operation unit 28, the screen transitions to a reprinting screen 260 illustrated in FIG. 15.

Figure 15:
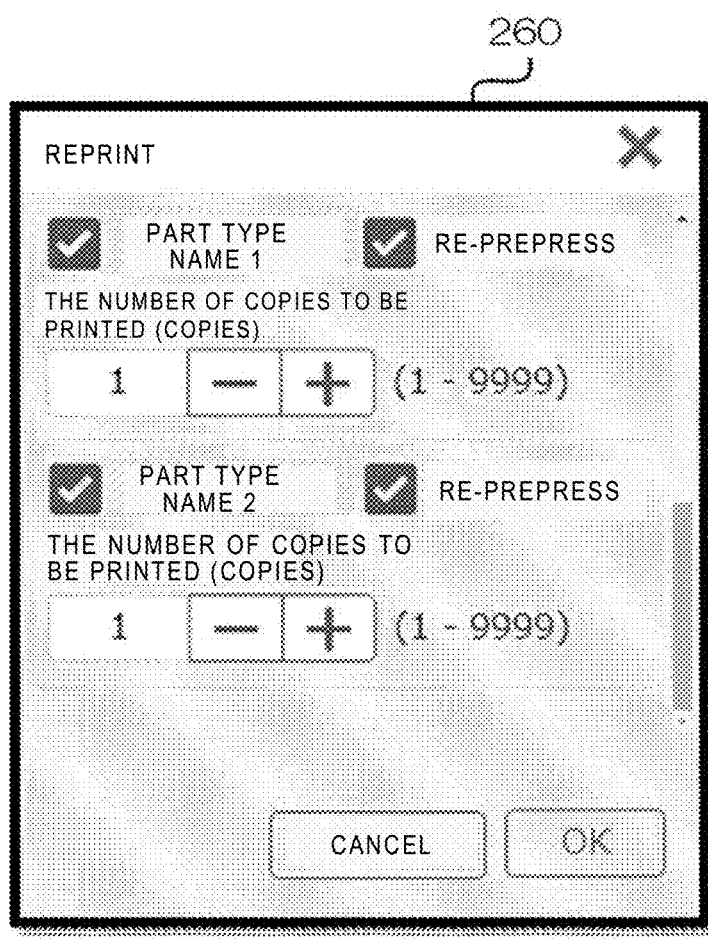
FIG. 15 illustrates an example of a reprinting screen according to the exemplary embodiment.

FIG. 15 illustrates an example of the reprinting screen 260 according to the present exemplary embodiment.

In the reprinting screen 260 illustrated in FIG. 15, the number of copies to be reprinted can be designated for each part. Here, for example, the number of copies to be reprinted can be designated for each of the part represented by the "part type name 1" and the part represented by the "part type name 2". The number of copies to be reprinted is specified based on the number of copies specified in the reprinting screen 260. When all of "automatically start a work", "automatically transmit data at a start of a work", and "automatically complete a work" are designated for each process in the process edit screen 210 illustrated in FIG. 10A, the reprocessing is automatically executed with the number of copies designated in the reprinting screen 260.

Figure 16:
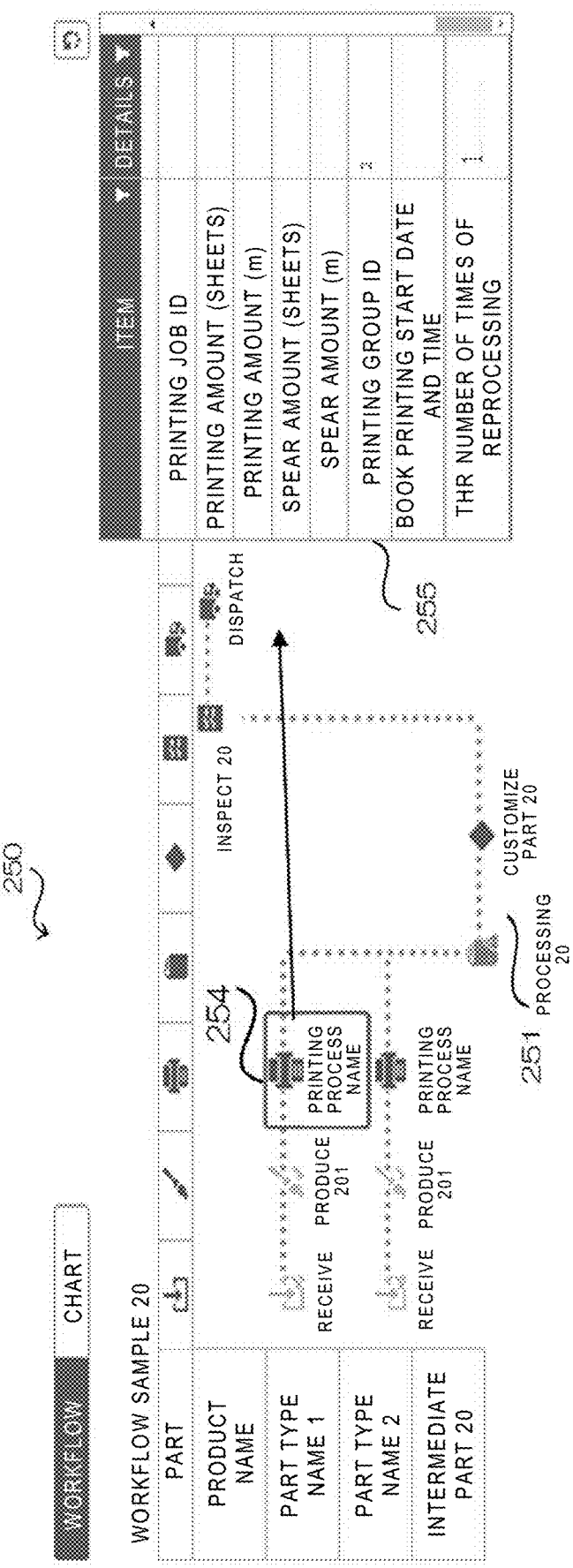
FIG. 16 illustrates another example of the product workflow display region according to the exemplary embodiment.

FIG. 16 illustrates another example of the product workflow display region 250 according to the present exemplary embodiment.

In the product workflow display region 250 illustrated in FIG. 16, a product workflow after reprocessing is displayed. The product workflow includes the intermediate object 251 represented by the "processing 20" for the "intermediate part 20" and a work object 254 represented by the "printing process name" of the "part type name 1". As described above, since some error has occurred in the process for the intermediate part represented by the "intermediate part 20", for example, a process of the work object 254 represented by the "printing process name" of the "part type name 1" is added. That is, the part represented by the "part type name 1" is retroactively reprocessed.

The CPU 20A registers a work object corresponding to a reprocessing work in association with information on the reprocessing work. In the example of FIG. 16, the work object 254 corresponds to the reprocessing work. It is noted that process information 255 including a status of the added process is displayed without changing the number of icons. The process information 255 is an example of the information on the reprocessing work, and includes (i) the number of copies of the added part, a status of the added part, the number of times of reprocessing for the added part. In the process information 255, the number of copies, the status, and the number of times of reprocessing are changed each time the reprocessing is performed.

FIG. 17 illustrates an example of a detail screen 270 according to the present exemplary embodiment.

When the reprocessing for the part is performed as described above, a process is added internally, and one record of the printing process is added in the detail screen 270 illustrated in FIG. 17. Specifically, in the detail screen 270, a record 271 and status information 272 are displayed. The record 271 is a record corresponding to the added printing process (for example, represented by a "printing process name"). The status information 272 is information on a status of the printing process corresponding to the record 271. The status managed in the status information 272 is reflected in the process information 255.

Figure 18:
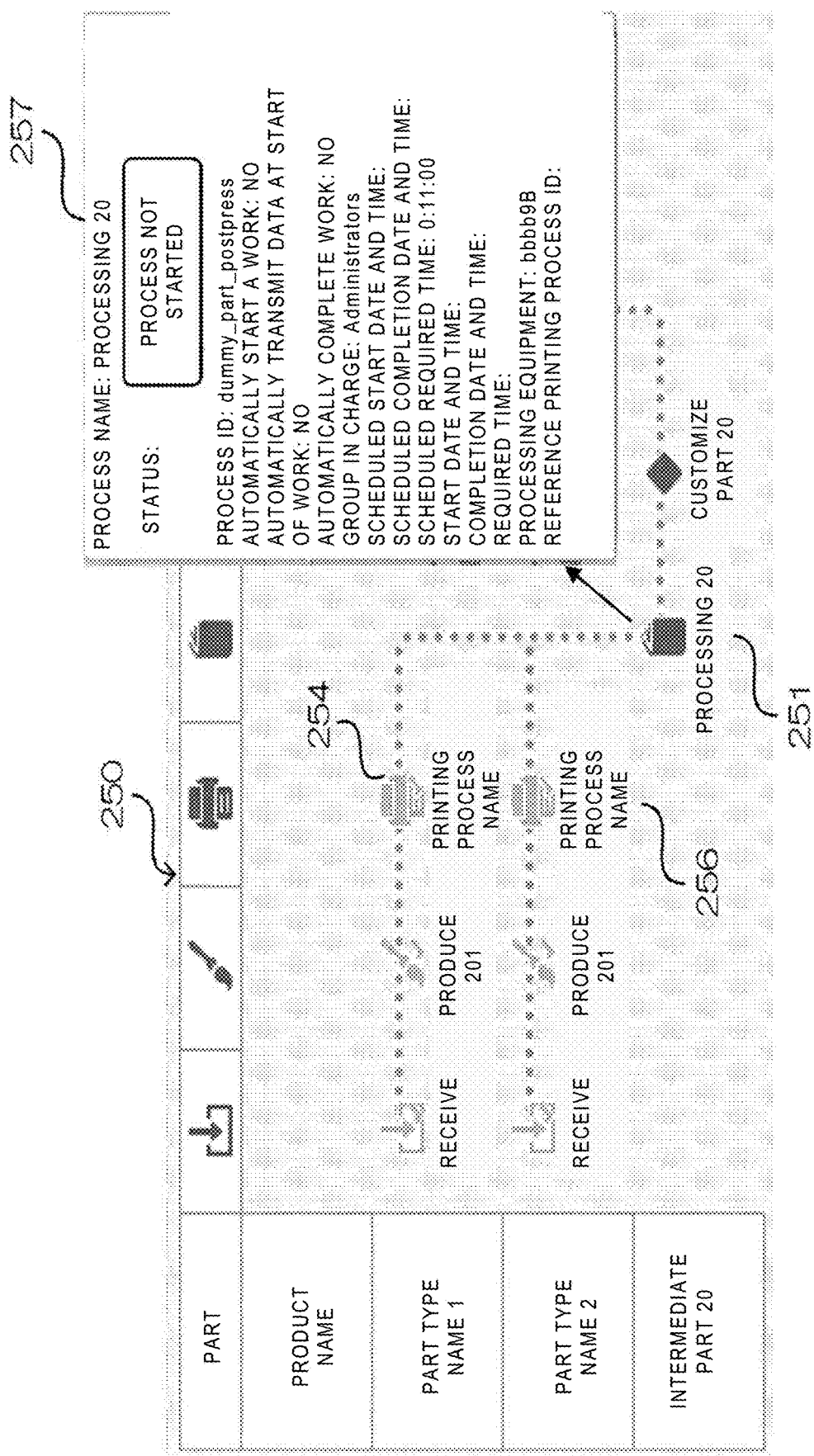
FIG. 18 illustrates further another example of the product workflow display region according to the exemplary embodiment.

FIG. 18 illustrates further another example of the product workflow display region 250 according to the present exemplary embodiment.

In the product workflow display region 250 illustrated in FIG. 18, a product workflow when the final processes for the parts are completed is displayed. The product workflow includes the intermediate object 251 represented by the "processing 20" for the "intermediate part 20", the work object 254 represented by the "printing process name" of the "part type name 1", and a work object 256 represented by the "printing process name" of the "part type name 2". The intermediate object 251 is associated with work attribute information 257 including the status information of the corresponding intermediate part. The work attribute information 257 may pop-up when the intermediate object 251 is designated.

When all works for at least two parts constituting the intermediate part are completed in the product workflow, the CPU 20A sets a state in which first work for the intermediate part can be started. Specifically, in the example in FIG. 18, when all the works for each of the parts of the "part type name 1" and the "part type name 2 are completed, the state is set in which the first work for the intermediate part of the "intermediate part 20" can be started, that is, a status of the work attribute information 257 becomes "process not started".

Figure 19:
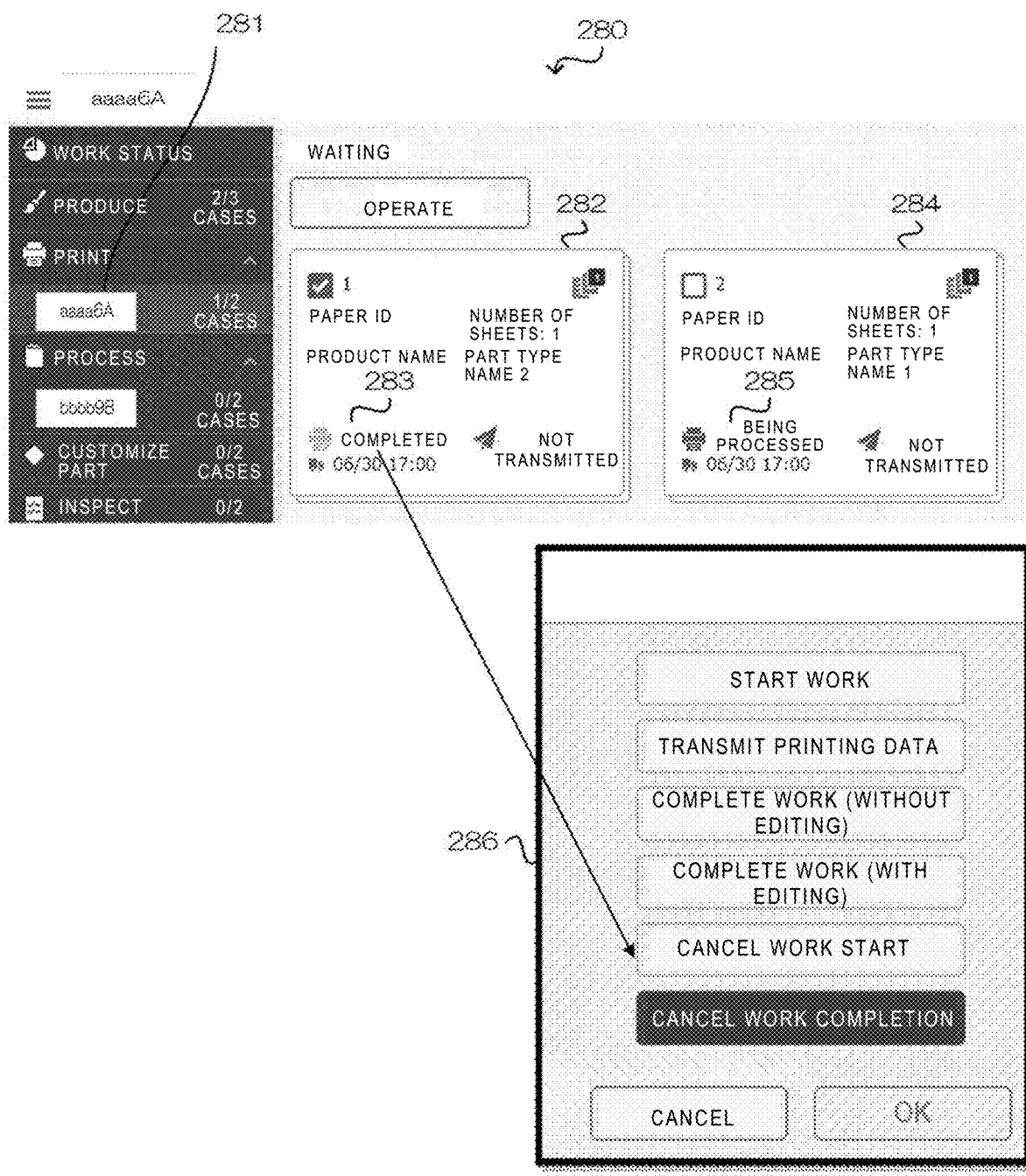
FIG. 19 illustrates an example of the work status screen and a work completion cancellation dialog of the printing device according to the exemplary embodiment.

FIG. 19 illustrates an example of a work status screen 280 and a work completion cancellation dialog 286 of the printing device according to the present exemplary embodiment.

In the work status screen 280 illustrated in FIG. 19, the work status of the printing device (printing equipment) "aaaa6A" used for printing each of the parts of the "part type name 1" and the "part type name 2" is managed. In the work status screen 280, when an item 281 related to "aaaa6A" is selected, work status information 282 corresponding to the "part type name 2" and work status information 284 corresponding to the "part type name 1" are displayed. In the work status information 282 corresponding to the "part type name 2", a status 283 is displayed as "completed". In the work status information 284 corresponding to the "part type name 1", a status 285 is displayed as "being processed".

When the first work for the intermediate part is set to be in the state in which the first work can be started in the product workflow, the CPU 20A may cancel a work completion state for each of the at least two parts constituting the intermediate part. Specifically, when the status of the process "processing 20" is "process not started", "completed" that is the status 283 of the "part type name 2" can be cancelled. The "completed" is cancelled through the work completion cancellation dialog 286. When the status of the process "processing 20" is being processed or completed, completion of the work related to the part printing cannot be cancelled.

Next, with reference to FIGS. 20A to 23B, specific examples of a method of adding a process when a part is reprocessed will be described.

FIGS. 20A to 20C illustrate an example of the method of adding a process of reprocessing according to the present exemplary embodiment.

As illustrated in FIG. 20A, it is assumed that, for example, for a certain part, the number of ordered copies is 100, the number of internal reserves is 20, the number of copies to be manufactured is 120, and the number of copies to be printed is 120. "Receive" indicates a receiving process, "P" indicates a prepress process, "print" indicates a printing process, and "processing" indicates a processing process.

As illustrated in FIG. 20B, when the number of non-defective products (indicated by "non-defective") is 80 and the number of defective products (indicated by "defective") is 40 in the 120 printed copies in the process "print", a status of "print" is set to "print temporarily completed" indicating that the printing is temporarily completed. At this time, the total number of non-defective products (indicated by "total non-defective") is 80, and the total number of defective products (indicated by "total defective") is 40.

As illustrated in FIG. 20C, a process "print" of reprinting 40 copies (that is equal to the number of the defective products) is added as "print 2". A status of the process "print 2" at a time of addition is "not started". Then, the status of the "print temporarily completed" illustrated in FIG. 20B is changed to "print completed". At this time, the total number of non-defective products is 120 (=80+40), and the total number of defective products is 40.

FIGS. 21A to 21C illustrate another example of the method of adding a process of reprocessing according to the present exemplary embodiment.

As illustrated in FIG. 21A, when the number of non-defective products is 30 and the number of defective products is 10 as a result of the reprinting in the process "print 2" illustrated in FIG. 20C described above, the status of the "print 2" is "print temporarily completed 2". At this time, the total number of non-defective products is 110 (=80+30), and the total number of defective products is 50 (=40+10).

As illustrated in FIG. 21B, a status of the "print temporarily completed 2" illustrated in FIG. 21A is changed to "print completed 2".

As illustrated in FIG. 21C, the number of copies to be processed in a process "processing" is set to 120. At this time, the total number of non-defective products is 0, and the total number of defective products is 0.

Figure 22A:
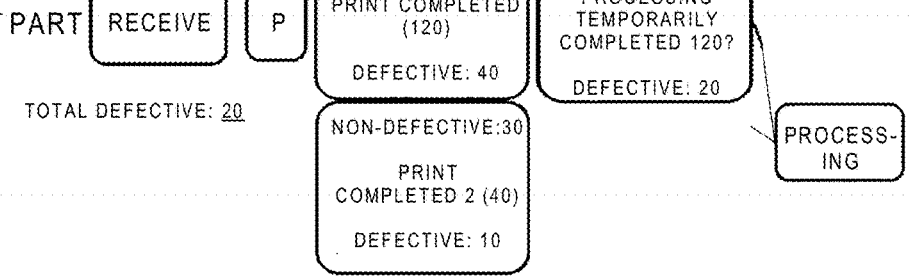
FIGS. 22A to 22C illustrate further another example of a method of adding a process of reprocessing according to the exemplary embodiment.
Figure 22B:
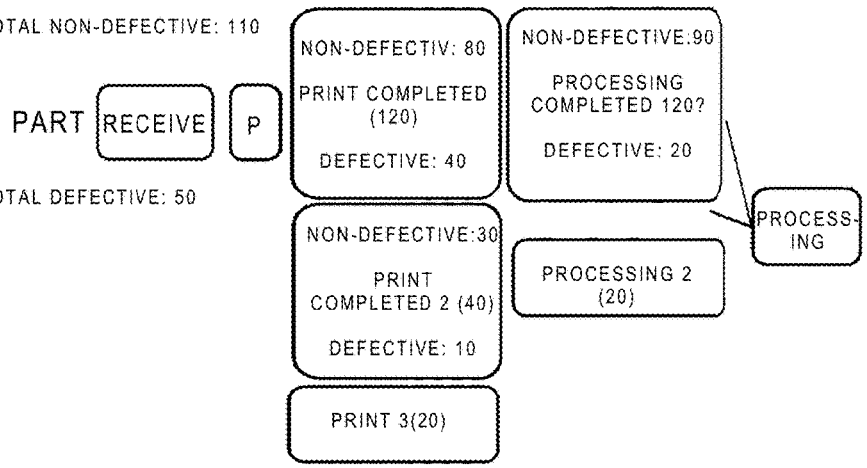
Figure 22C:
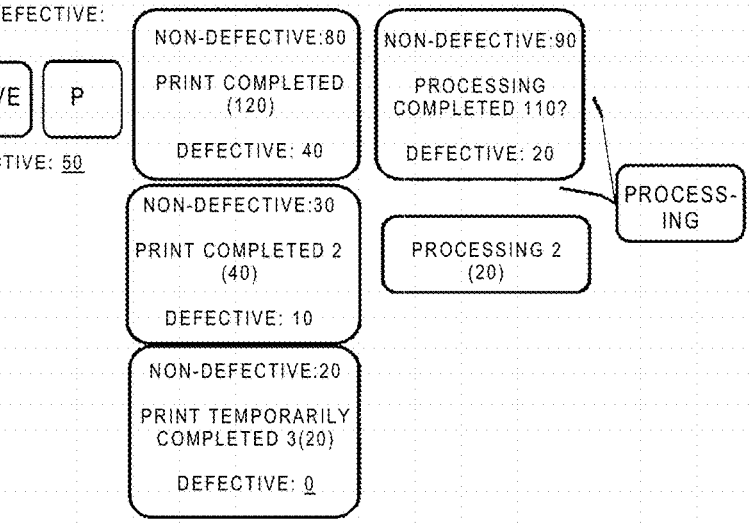

FIGS. 22A to 22C illustrate further another example of the method of adding a process of reprocessing according to the present exemplary embodiment.

As illustrated in FIG. 22A, when the number of non-defective products is 90 and the number of defective products is 20 among the 120 printed copies in the process "processing" illustrated in FIG. 21C described above, the status of the "processing" is set to "processing temporarily completed". At this time, the total number of non-defective products is 90, and the total number of defective products is 20.

As illustrated in FIG. 22B, a process "processing" of reprocessing 20 copies (corresponding to the number of the defective products) is added as "processing 2". Furthermore, a processing "print" of reprinting 20 copies is added as "print 3". Then, the status of "processing temporarily completed" illustrated in FIG. 22A is changed to "processing completed". At this time, the total number of non-defective products is 110 (=80+30), and the total number of defective products is 50 (=40+10).

As illustrated in FIG. 22C, when the number of non-defective products is 20 and the number of defective products is 0 among the 20 printed copies in the process "print 3" illustrated in FIG. 22B described above, the status of the "print 3" is set to the "print temporarily completed 3". At this time, the total number of non-defective products is 130 (=80+30+20), and the total number of defective products is 50 (=40+10).

Figure 23A:
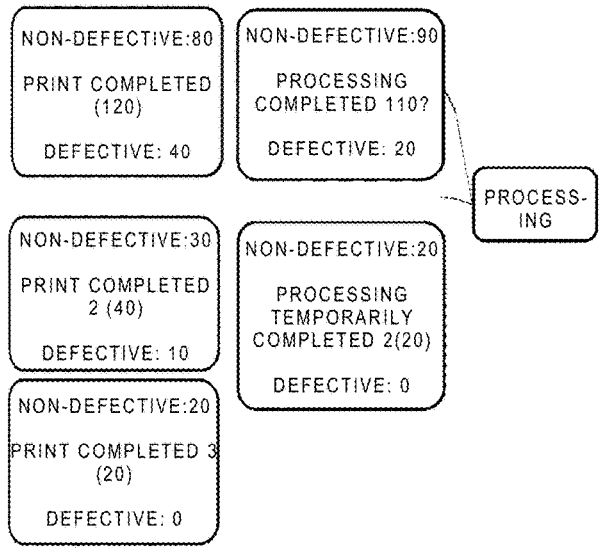
FIGS. 23A and 23B illustrate still another example of a method of adding a process of reprocessing according to the exemplary embodiment.
Figure 23B:
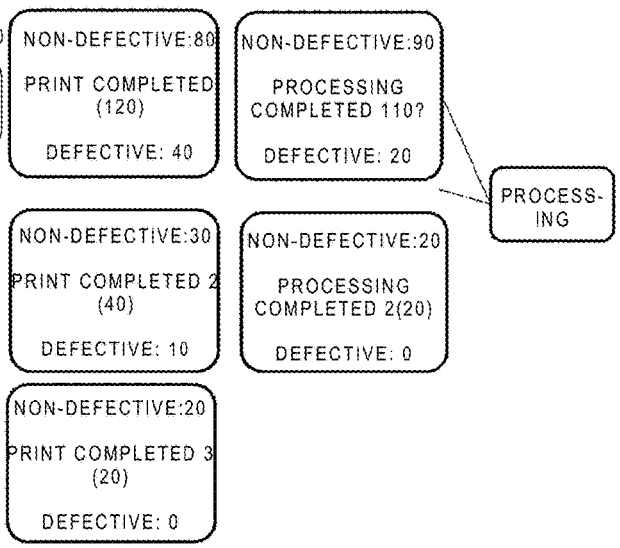

FIGS. 23A and 23B illustrate still another example of the method of adding a process of reprocessing according to the present exemplary embodiment.

As illustrated in FIG. 23A, when the number of non-defective products is 20 and the number of defective products is 0 among the 20 printed copies in the process "processing 2" illustrated in FIG. 22C described above, a status of the "processing 2" is set to "processing temporarily completed 2". At this time, the total number of non-defective products is 110 (=90+20), and the total number of defective products is 20 (=20+0).

As illustrated in FIG. 23B, the status of the "processing temporarily completed 2" illustrated in FIG. 23A is changed to "processing completed 2". At this time, the total number of non-defective products is 110, and the total number of defective products is 20.

In this way, according to the present exemplary embodiment, control is performed to display the progress status of each of at least two parts constituting the intermediate part when the processing for the intermediate part is not started. The cause of the processing for the intermediate part being unable to start is more easily known as compared with a case in which a workflow is generated and managed without treating an intermediate part generated by combining plural parts as a management target.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the exemplary embodiments above, and may be changed.

In the above, the information processing device according to the exemplary embodiment has been exemplified. The exemplary embodiments may be implemented in a form of a program that causing a computer to execute functions of respective elements included in the information processing device. The exemplary embodiments may be in a form of a non-transitory computer readable storage medium storing the program.

The configuration of the information processing devices described in the above-described exemplary embodiments are examples, and may be changed depending on situations without departing from a gist.

The flow of the program described in the above-described exemplary embodiment is also an example. For example, an unnecessary step may be deleted, a new step may be added, or the processing order may be changed without departing from the gist.

The above-described exemplary embodiments have described cases in which the processing according to the exemplary embodiments are implemented with a software configuration by using the computer to execute the program, and the present disclosure is not limited thereto. The exemplary embodiments may be implemented by, for example, a hardware configuration or a combination of the hardware configuration and the software configuration.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
  a processor configured to:
    specify a plurality of parts for manufacturing an ordered product;
    specify a plurality of processes required from receiving an order of the product to completion of the product using the plurality of parts;
    for an intermediate part generated by processing at least two of the plurality of parts, generate an intermediate object indicating the intermediate part;
    for each of the plurality of parts, generate work objects indicating processes required for manufacturing the part;
    create workflow information that
      arranges and displays, for each of the plurality of parts, the work objects indicating the processes required for manufacturing the part in an order of the plurality of processes, and
      relates and displays, for each of the plurality of parts, work objects indicating processes executed continuously, wherein in the workflow information, the intermediate object indicating the intermediate part is associated with the work objects for the at least two parts used to generate the intermediate part, the at least two parts being associated with the intermediate object by a lined association connecting the at least two parts to the intermediate object; and
    when processing for the intermediate part cannot be started in the created workflow information, perform control of displaying a progress status of each of the at least two parts constituting the intermediate part.

2. The information processing device according to claim 1, wherein
  the intermediate object comprises
    an intermediate processing object indicating the processing for the at least two parts, and
    an intermediate work object indicating a work for the generated intermediate part.

3. The information processing device according to claim 1, wherein
  the processor is configured to:
    create display information for displaying the workflow information on a display; and
    output the created display information to the display.

4. The information processing device according to claim 2, wherein
  the processor is configured to:
    create display information for displaying the workflow information on a display; and
    output the created display information to the display.

5. The information processing device according to claim 1, wherein
the processor is configured to:
acquire manufacturing information for manufacturing the ordered product;
extract matching template that matches the manufacturing information from a storage based on the acquired manufacturing information, the storage storing a plurality of pieces of template information in which
for each of the plurality of parts, the work objects indicating the processes required for manufacturing each part are related in the order of a plurality of works,
for each of the plurality of parts, the work objects indicating the processes executed continuously are related, and
the intermediate object indicating the intermediate part is associated with the work objects; and
specify the plurality of parts for manufacturing the ordered product and the plurality of processes required before the product is completed, using the extracted matching template, generate the intermediate object indicating the intermediate part and the work objects, and create the workflow information.

6. The information processing device according to claim 2, wherein
the processor is configured to:
acquire manufacturing information for manufacturing the ordered product;
extract matching template that matches the manufacturing information from a storage based on the acquired manufacturing information, the storage storing a plurality of pieces of template information in which
for each of the plurality of parts, the work objects indicating the processes required for manufacturing each part are related in the order of a plurality of the works,
for each of the plurality of parts, the work objects indicating the processes executed continuously are related, and
the intermediate object indicating the intermediate part is associated with the work objects; and
specify the plurality of parts for manufacturing the ordered product and the plurality of processes required before the product is completed, using the extracted matching template, generate the intermediate object indicating the intermediate part and the work objects, and create the workflow information.

7. The information processing device according to claim 3, wherein
the processor is configured to:
acquire manufacturing information for manufacturing the ordered product;
extract matching template that matches the manufacturing information from a storage based on the acquired manufacturing information, the storage storing a plurality of pieces of template information in which
for each of the plurality of parts, the work objects indicating the processes required for manufacturing each part are related in the order of a plurality of works,
for each of the plurality of parts, the work objects indicating the processes executed continuously are related, and
the intermediate object indicating the intermediate part is associated with the work objects; and
specify the plurality of parts for manufacturing the ordered product and the plurality of processes required before the product is completed, using the extracted matching template, generate the intermediate object indicating the intermediate part and the work objects, and create the workflow information.

8. The information processing device according to claim 4, wherein
the processor is configured to:
acquire manufacturing information for manufacturing the ordered product;
extract matching template that matches the manufacturing information from a storage based on the acquired manufacturing information, the storage storing a plurality of pieces of template information in which
for each of the plurality of parts, the work objects indicating the processes required for manufacturing each part are related in the order of a plurality of the works,
for each of the plurality of parts, the work objects indicating the processes executed continuously are related, and
the intermediate object indicating the intermediate part is associated with the work objects; and
specify the plurality of parts for manufacturing the ordered product and the plurality of processes required before the product is completed, using the extracted matching template, generate the intermediate object indicating the intermediate part and the work objects, and create the workflow information.

9. The information processing device according to claim 1, wherein
the processor is configured to:
specify a part that causes the processing for the intermediate part to be unable to start in the workflow information from the at least two parts constituting the intermediate part; and
specify a process that causes the processing for the intermediate part to be unable to start in the workflow information.

10. The information processing device according to claim 2, wherein
the processor is configured to:
specify a part that causes the processing for the intermediate part to be unable to start in the workflow information from the at least two parts constituting the intermediate part; and
specify a process that causes the processing for the intermediate part to be unable to start in the workflow information.

11. The information processing device according to claim 3, wherein
the processor is configured to:
specify a part that causes the processing for the intermediate part to be unable to start in the workflow information from the at least two parts constituting the intermediate part; and
specify a process that causes the processing for the intermediate part to be unable to start in the workflow information.

12. The information processing device according to claim 4, wherein
the processor is configured to:

specify a part that causes the processing for the intermediate part to be unable to start in the workflow information from the at least two parts constituting the intermediate part; and specify a process that causes the processing for the intermediate part to be unable to start in the workflow information.

13. The information processing device according to claim 5, wherein
the processor is configured to:
specify a part that causes the processing for the intermediate part to be unable to start in the workflow information from the at least two parts constituting the intermediate part; and
specify a process that causes the processing for the intermediate part to be unable to start in the workflow information.

14. The information processing device according to claim 6, wherein
the processor is configured to:
specify a part that causes the processing for the intermediate part to be unable to start in the workflow information from the at least two parts constituting the intermediate part; and
specify a process that causes the processing for the intermediate part to be unable to start in the workflow information.

15. The information processing device according to claim 9, wherein
the processor is configured to perform control of notifying an administrator who manages the process for the part that causes the processing for the intermediate part to be unable to start, that the process is delayed.

16. The information processing device according to claim 1, wherein
the processor is configured to, when an error occurs in the intermediate part, specify the number of copies to be reprocessed for each of the at least two parts constituting the intermediate part in the workflow information.

17. The information processing device according to claim 16, wherein
the processor is configured to register a work object corresponding to a work of the reprocessing in association with information on the work of the reprocessing.

18. The information processing device according to claim 1, wherein
the processor is configured to set a state in which a first work for the intermediate part is able to be started when all works for the at least two parts constituting the intermediate part are completed in the workflow information.

19. The information processing device according to claim 18, wherein
the processor is configured to cancel a work completion state for each of the at least two parts constituting the intermediate part when the state in which the first work for the intermediate part is able to be started is set in the workflow information.

20. A non-transitory computer readable medium storing a program that causes a computer to execute information processing, the information processing comprising:
specifying a plurality of parts for manufacturing an ordered product;
specifying a plurality of processes required from receiving an order of the product to completion of the product using the plurality of parts;
for an intermediate part generated by processing at least two of the plurality of parts, generating an intermediate object indicating the intermediate part;
for each of the plurality of parts, generating work objects indicating processes required for manufacturing the part;
creating workflow information that
arranges and displays, for each of the plurality of parts, the work objects indicating the processes required for manufacturing the part in an order of the plurality of processes, and
relates and displays, for each of the plurality of parts, work objects indicating processes executed continuously, wherein in the workflow information, the intermediate object indicating the intermediate part is associated with the work objects for the at least two parts used to generate the intermediate part, the at least two parts being associated with the intermediate object by a lined association connecting the at least two parts to the intermediate object; and
when processing for the intermediate part cannot be started in the created workflow information, performing control of displaying a progress status of each of the at least two parts constituting the intermediate part.

* * * * *